(12) United States Patent
Volkerink et al.

(10) Patent No.: US 12,281,913 B1
(45) Date of Patent: Apr. 22, 2025

(54) MANAGING ASSETS AND PERFORMANCE USING WIRELESS SENSING SYSTEMS

(71) Applicant: Trackonomy Systems, Inc., San Jose, CA (US)

(72) Inventors: Hendrik J Volkerink, Palo Alto, CA (US); Ajay Khoche, West San Jose, CA (US); Taylor Albert Gregoire-Wright, Palo Alto, CA (US)

( * ) Notice: Subject to any disclaimer, the term of this patent is extended or adjusted under 35 U.S.C. 154(b) by 0 days.

(21) Appl. No.: 18/444,720

(22) Filed: Feb. 18, 2024

Related U.S. Application Data

(63) Continuation of application No. 17/450,980, filed on Oct. 14, 2021, now Pat. No. 11,946,766, which is a continuation-in-part of application No. 16/953,238, filed on Nov. 19, 2020, now Pat. No. 11,907,796.

(60) Provisional application No. 63/091,635, filed on Oct. 14, 2020, provisional application No. 62/937,501, filed on Nov. 19, 2019.

(51) Int. Cl.
| | |
|---|---|
| *H04W 4/80* | (2018.01) |
| *G01C 21/36* | (2006.01) |
| *G06K 7/10* | (2006.01) |
| *H04W 4/021* | (2018.01) |
| *H04W 4/024* | (2018.01) |
| *H04W 4/029* | (2018.01) |
| *G06F 3/04817* | (2022.01) |
| *H04W 84/18* | (2009.01) |

(52) U.S. Cl.
CPC ...... *G01C 21/3679* (2013.01); *G01C 21/3673* (2013.01); *G06K 7/10297* (2013.01); *H04W 4/021* (2013.01); *H04W 4/024* (2018.02); *H04W 4/029* (2018.02); *H04W 4/80* (2018.02); *G06F 3/04817* (2013.01); *H04W 84/18* (2013.01)

(58) Field of Classification Search
CPC ............ G01C 21/3679; G01C 21/3673; G06K 7/10297; H04W 4/021; H04W 4/024; H04W 4/029; H04W 4/80; H04W 84/18; G06F 3/04817
See application file for complete search history.

(56) References Cited

U.S. PATENT DOCUMENTS

| | | | | |
|---|---|---|---|---|
| 2016/0117765 | A1* | 4/2016 | Koeppel | ............... G06T 11/001 705/35 |
| 2021/0020012 | A1* | 1/2021 | Shakedd | ................. H04B 1/40 |

\* cited by examiner

*Primary Examiner* — Jamara A Franklin

(57) ABSTRACT

A method includes receiving, by a node of a wireless sensing system from a user device, a request for information describing an asset. The node establishes communication connections with a set of tape nodes of the wireless sensing system, each tape node of the set of tape nodes being associated with a respective asset of the wireless sensing system. The node receives, via the communication connections, information describing the respective assets of the wireless sensing system. The node then filters the information describing the respective assets of the wireless sensing system and transmits the filtered information to the user device for display.

17 Claims, 16 Drawing Sheets

MANAGING ASSETS AND PERFORMANCE USING WIRELESS SENSING SYSTEMS

CROSS-REFERENCE TO RELATED APPLICATIONS

This application is a continuation to pending U.S. patent application Ser. No. 17/450,980, filed Oct. 14, 2021, which claims priority to U.S. Provisional Application No. 63/091,635 filed Oct. 14, 2020, and this application is a continuation-in-part of U.S. Patent Application Ser. No. 16/953,238, filed Nov. 19, 2020, now U.S. Pat. No. 11,907,796, which claims priority to U.S. Provisional Patent Application No. 62/937,501, filed Nov. 19, 2019, all of which are incorporated by reference in their entirety.

FIELD OF THE DISCLOSURE

The disclosure generally relates to asset management and tracking.

BACKGROUND

In environments having a large number of assets, it is often difficult to manage and optimize use of assets throughout the environment. For example, hospital and other business environments often include one or more buildings, wards, or areas, as well as having a large number of assets that are moved around the environment for use, maintenance, or storage. Assets may become lost, or may be difficult to locate when they are needed, causing a negative impact to productivity and efficiency of users in the environment.

SUMMARY

By enabling users of a wireless sensing system to request current information relevant to assets that may be spread across multiple buildings, wards, rooms, or other areas of a business or hospital environment, the wireless sensing system enables users to quickly locate assets that may be otherwise difficult to find. The wireless sensing system is configured to identify, locate, and filter assets in the environment quickly and provide the information to users of the wireless sensing system. The wireless sensing system includes one or more nodes of an adhesive tape platform. The nodes of the adhesive tape platform are wireless communication devices with an unobtrusive adhesive tape form factor. A "node" or "tape node" of the adhesive tape platform may collectively refer to an adhesive tape platform or a segment of an adhesive tape platform, herein.

In an aspect, the wireless sensing system comprises a plurality of white tape nodes (e.g., tape nodes with a short communication range) associated with assets in the business or hospital environment and a plurality of gateway and green tape nodes (e.g., tape nodes with a longer communication range than the white tape nodes). associated with locations in the business or hospital environment. Each white tape node of the plurality of white tape nodes is associated with a name or identifier of a respective asset, as well as other information about the respective asset, such as an asset type, an asset function, an asset status, an asset condition, and the like. Each gateway or green tape node is associated with a location of the node, e.g., a room or area of the environment. The white tape nodes are configured to communicate with the gateway and green tape nodes. Based on the communications, the wireless sensing system determines current locations for each asset in the environment. In some embodiments, tape nodes of a different type than the white tape node and the green tape node are used to track assets and locations in the business or hospital environment.

In an aspect, the wireless sensing system additionally comprises one or more user devices. The user devices are, for example, smartphones, smart watches, wristbands, laptop or desktop computers, or other computing devices. The user devices are configured to communicate with the wireless sensing system and to display an interface for managing assets in the environment.

In an embodiment, the wireless sensing system is configured to, in response to receiving a request for information about assets from a user device, communicate the information to the user device. For example, requests may include a request to locate a nearest asset of an asset type or asset function; a request to view a summary of usage for assets of an asset type; a request to view usage or a current location of a specific asset; other information relevant to the asset, or the like. In an embodiment, the user device communicates the requests to a server or cloud of the wireless sensing system. The server or cloud of the wireless sensing system communicates with one or more gateway or green tape nodes to retrieve the requested information.

In an embodiment, the wireless sensing system filters or ranks the requested information. For example, the filtering or ranking may be performed based on asset type, asset function, asset status, asset condition, asset location, and the like. The wireless sensing system transmits the filtered information to the requesting user device for display to the user.

In an aspect, a user interface for managing assets in a business or hospital environment is further disclosed. In an embodiment, the user interface includes a first interface enabling a user of a user device to transmit requests for information to the wireless sensing system. For example, the user interface includes one or more dropdown boxes identifying asset types, asset names, asset identifiers, and the like, and may further include one or more filtering or ranking options based on, e.g., a current status of an asset, a current condition of an asset, a current location of an asset, a current location of a user, and the like.

In an embodiment, the user interface further includes a second interface guiding a user of the user device to locate an asset. For example, the second interface may be a map representation of the environment. The map representation may include one or more pins indicating a current location of the user and/or a current location of one or more assets. The map representation may additionally include text, arrows, or other directional indicators to guide the user through the environment. In an embodiment, the map representation is interactable to provide information to the user describing one or more assets corresponding to a user's request. In some embodiments, the user interface includes a third interface which is an augmented reality (AR) view that shows overlays on a live video captured by a camera of the user device.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

Introduction

In a hospital setting or other environments, it may be imperative for nurses or other human operators to locate assets such as hospital beds or hospital equipment as quickly as possible. In particular, it is important for the assets to be available for use (e.g., not currently in use by another patient), clean, and accessible. Users of a wireless sensing system can request current information relevant to assets that may be spread across multiple buildings, wards, rooms, or other areas of a business or hospital environment to quickly locate assets that may be otherwise difficult to find. The wireless sensing system is configured to identify, locate, and filter assets in the environment quickly and provide the information to users of the wireless sensing system.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "wireless node" or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "wireless sensing system," "hierarchical communications network," "distributed agent operating system," and the like are used interchangeably herein to refer to a system or network of wireless nodes.

Adhesive Tape Platform

Figure 1A:
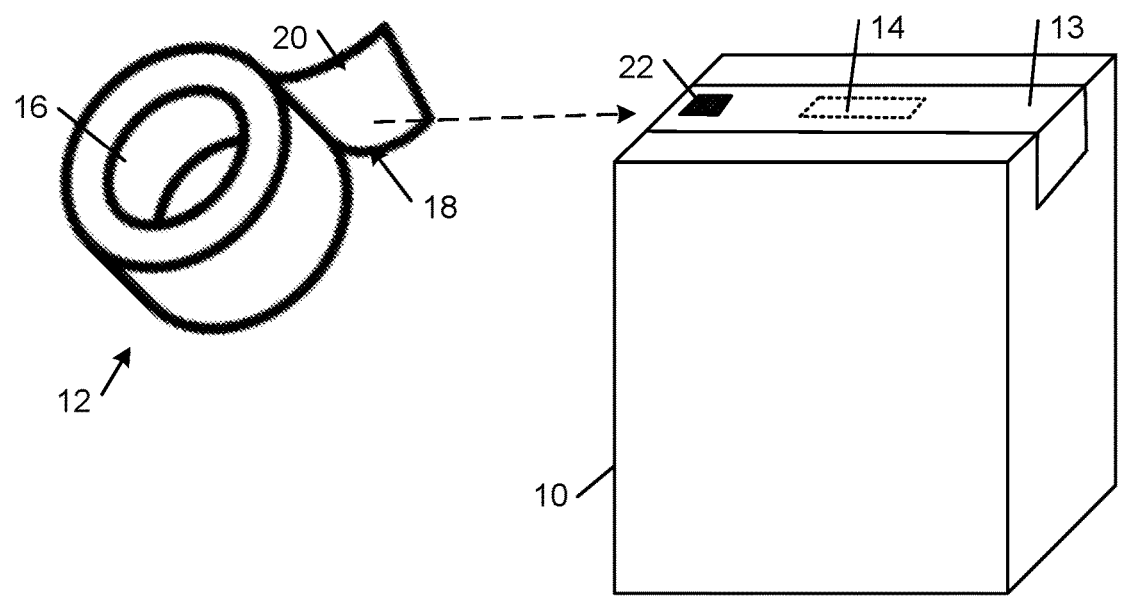
FIG. 1A is a diagrammatic view of an asset that has been sealed for shipment using a segment of an example adhesive tape platform dispensed from a roll, in an embodiment.

FIG. 1A shows an example asset 10 that is sealed for shipment using an example adhesive tape platform 12 that includes embedded wireless transducing components 14 (collectively referred to herein as a "tape node"). In this example, a segment 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
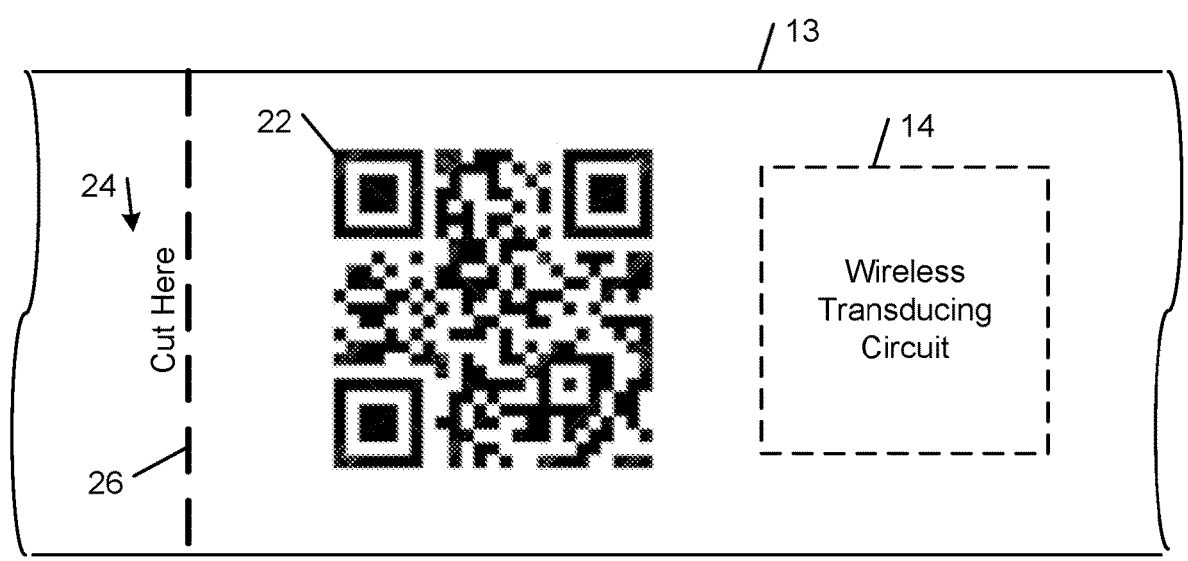
FIG. 1B is a diagrammatic top view of a portion of the segment of the example adhesive tape platform shown in FIG. 1A, in an embodiment.

Referring to FIG. 1B, in some examples, the non-adhesive side 20 of the segment 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the segment 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing components 14. The spacing between the wireless transducing components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the wireless transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the wireless transducing components 14 in all of the segments 13 in the given length of the adhesive tape platform 12. In some of these examples, the energy sources are connected in parallel and concurrently activated to power the wireless transducing components 14 in all of the segments 13 at the same time. In other examples, the energy sources are connected in parallel and alternately activated to power the wireless transducing components 14 in respective ones of the adhesive tape platform segments 13 at different time periods, which may or may not overlap.

Figure 2:
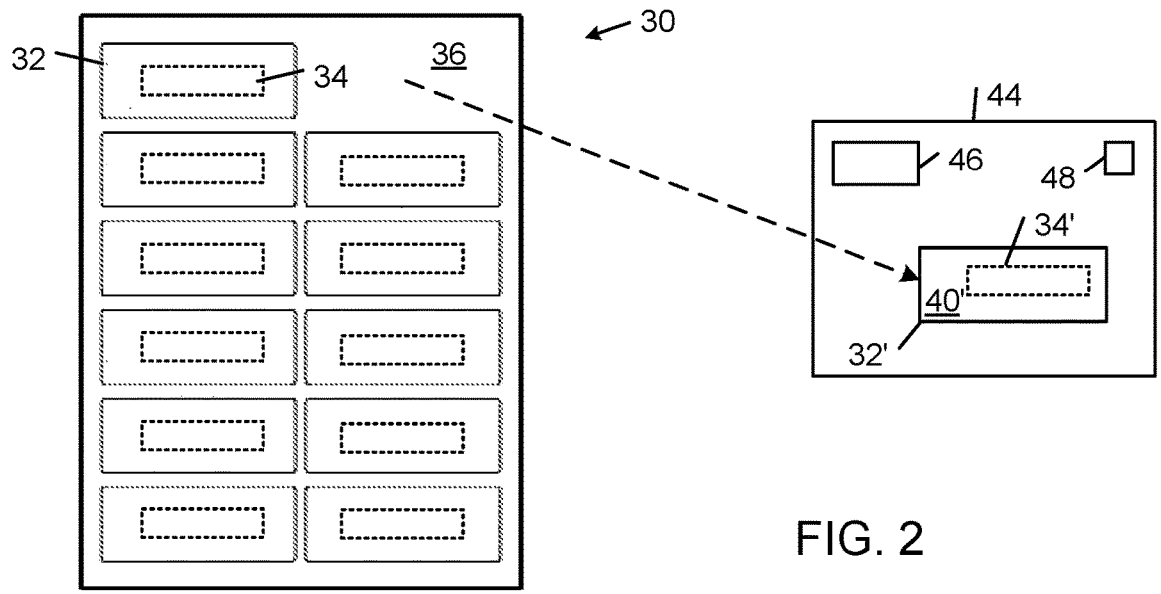
FIG. 2 is a diagrammatic view of an example of an envelope carrying a segment of an example adhesive tape platform dispensed from a backing sheet, in an embodiment.

FIG. 2 shows an example adhesive tape platform 30 that includes a set of adhesive tape platform segments 32 each of which includes a respective set of embedded wireless transducing components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of an asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing components 34 that are embedded in a segment 32 of the adhesive tape platform 12 are activated when the segment 32 is removed from the backing sheet 36. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing components 34 in the segment 32 in response to the detection of a change in capacitance between the segment 32 and the backing sheet 36 as a result of removing the segment 32 from the backing sheet 36.

Figure 3:
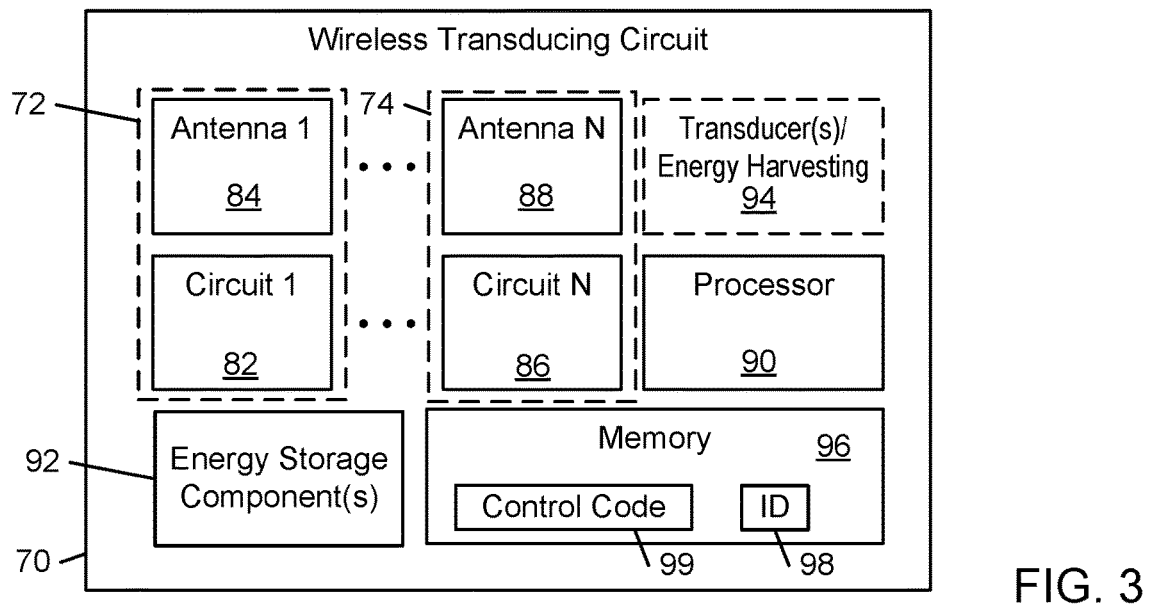
FIG. 3 is a schematic view of an example segment of an adhesive tape platform, in an embodiment.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage components 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
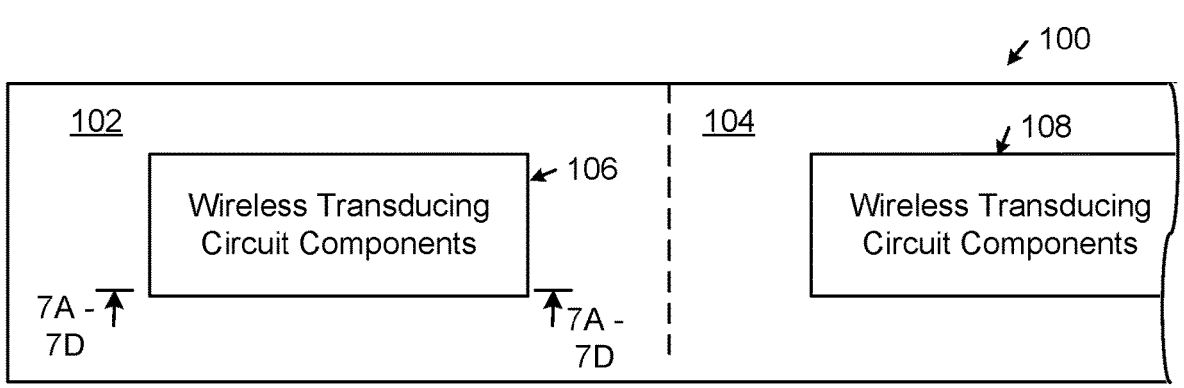
FIG. 4 is a diagrammatic top view of a length of an example adhesive tape platform, in an embodiment.

FIG. 4 is a top view of a portion of an example flexible adhesive tape platform 100 that shows a first tape node 102 and a portion of a second tape node 104. Each tape node 102, 104 of the flexible adhesive tape platform 100 includes a respective set 106, 108 of the components of the wireless transducing circuit 70. The tape nodes 102, 104 and their respective sets of components 106, 108 typically are identical and configured in the same way. In some other embodiments, however, the tape nodes 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the flexible adhesive tape platform 100 (see FIG. 4) according to a roll-to-roll fabrication process is described in connection with FIGS. 6, 7A, and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
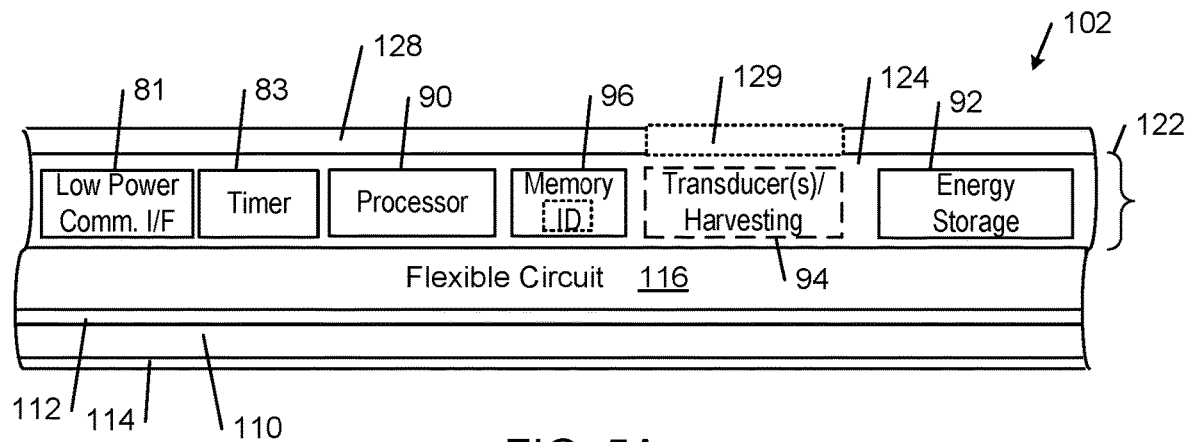
FIGS. 5A-5C show diagrammatic cross-sectional side views of portions of different respective adhesive tape platforms, in an embodiment.

FIG. 5A shows a cross-sectional side view of a portion of an example tape node 102 of the flexible adhesive tape platform 100 that includes a respective set of the components of the wireless transducing circuit components 106 corresponding to the first tape node type (i.e., white). The flexible adhesive tape platform segment or tape node 102 includes an adhesive layer 112, an optional flexible substrate 110, and an optional adhesive layer 114 on the bottom surface of the flexible substrate 110. If the adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment or tape node 102 from a surface on which the adhesive layer 114 is adhered without destroying the physical or mechanical integrity of the adhesive segment or tape node 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the flexible adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment or tape node 102. The low power wireless communication interface 81 typically includes one or more of the antennas 84, 88 and one or more of the wireless circuits 82, 86.

Figure 5B:
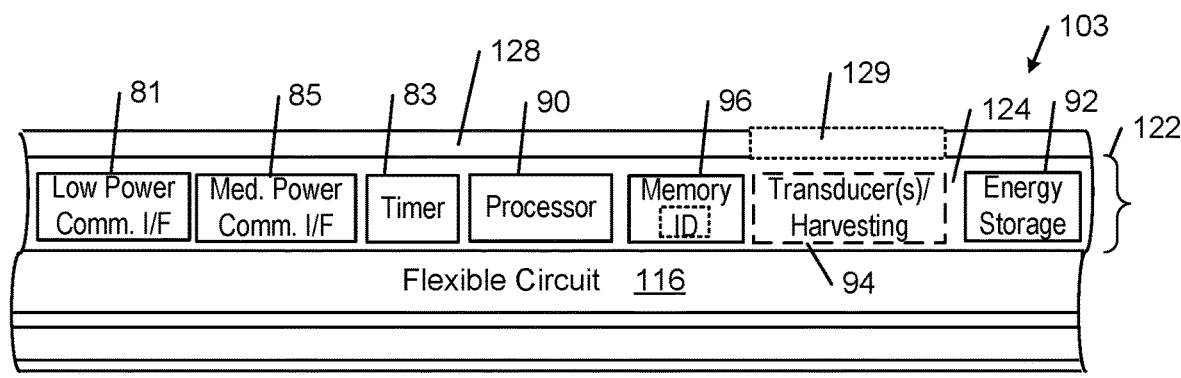

FIG. 5B shows a cross-sectional side view of a portion of an example tape node 103 of the flexible adhesive tape platform 100 that includes a respective set of the components of the wireless transducing circuit components 106 corresponding to the second tape node type (i.e., green). In this example, the flexible adhesive tape platform segment or tape node 103 differs from the tape node 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment or tape node 103 differ, for example, in functionality or capacity (e.g., larger energy source).

Figure 5C:
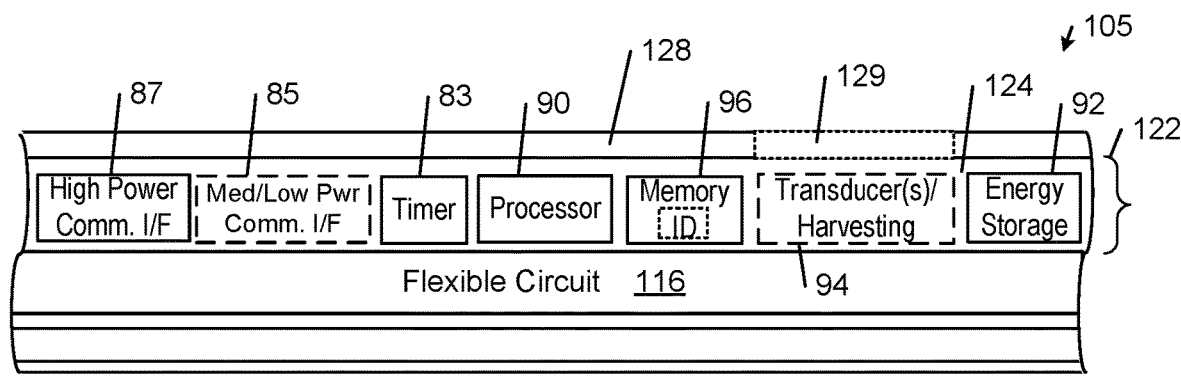

FIG. 5C shows a cross-sectional side view of a portion of an example tape node 105 of the flexible adhesive tape platform 100 that includes a respective set of the components of the wireless transducing circuit components 106 corresponding to the third tape node type (i.e., black). In this example, the flexible adhesive tape platform segment or tape node 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment or tape node 105 differ, for example, in functionality or capacity (e.g., larger energy source).

FIGS. 5A-5C show examples in which the cover 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the flexible adhesive tape platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, and U.S. Provisional Patent Application No. 62/670,712, filed May 11, 2018.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform tape node 102 so as to reduce potentially damaging asymmetric stresses that might be caused by the application of bending, torquing, pressing, or other forces that may be applied to the flexible adhesive tape platform segment or tape node 102 during use. In the illustrated example, a flexible cover 128 is bonded to the planarizing flexible polymer layer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the flexible adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage component 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three or more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments or tape nodes 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power wireless communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more transducers 94 and the memory 96. The backside conductive pattern connects the active electronics (e.g., the processor 90, the communications circuits 82, 86, and the transducers) on the front-side of the flexible circuit 116 to the electrodes of the flexible circuit 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the flexible adhesive tape platform 100 needed to seal the asset. This allows an automated packaging system to select the appropriate type of flexible adhesive tape platform 100 to use for scaling a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of flexible adhesive tape platforms 100.

Deployment of Tape Nodes

Figure 6:
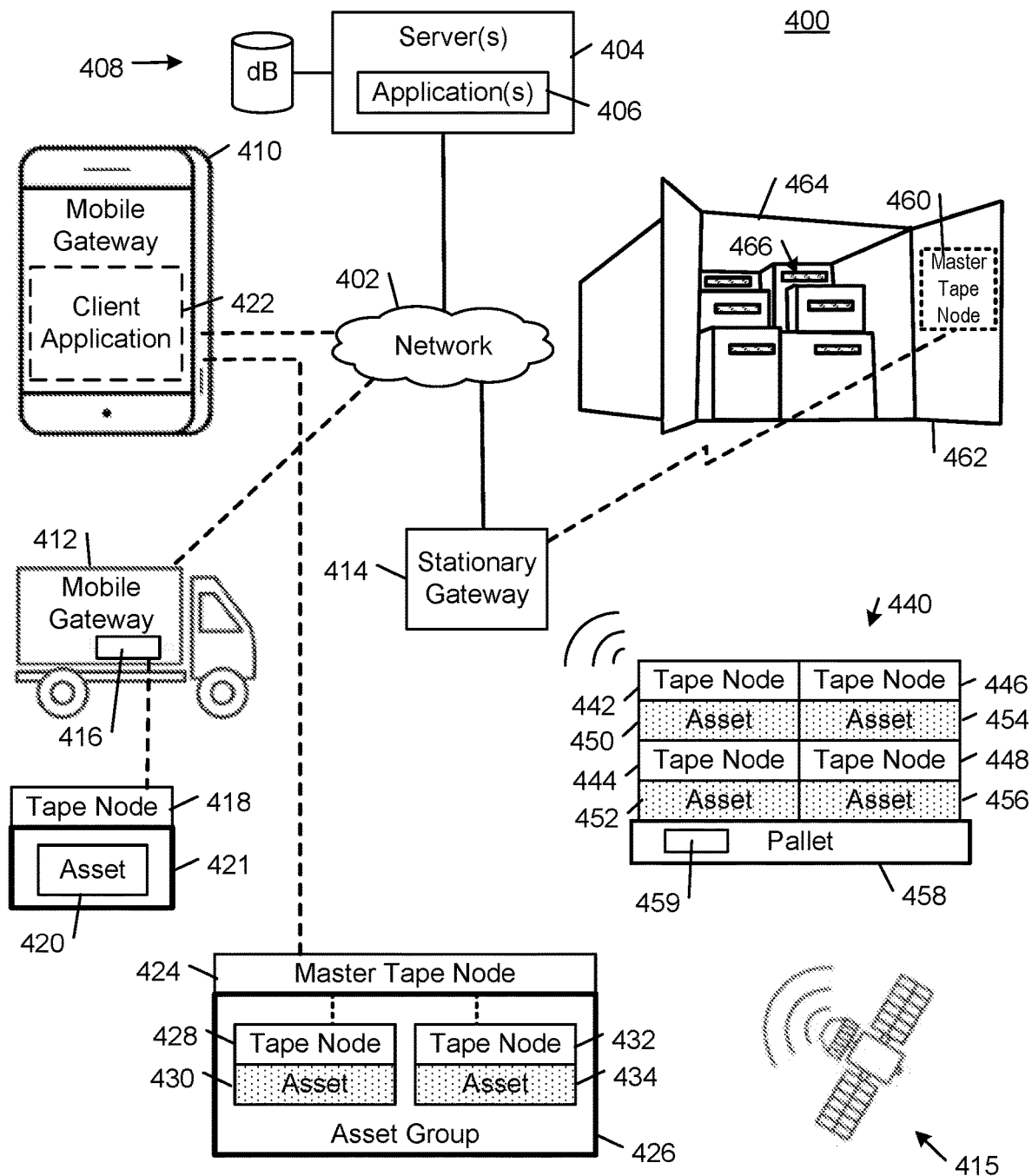
FIG. 6 is a diagrammatic view of an example of a network environment supporting communications with segments of an adhesive tape platform, in an embodiment.

FIG. 6 shows an example network communications environment or wireless sensing system 400 that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). The example network communication environment or wireless sensing system 400 may also be referred to as a wireless sensing system 400. The nodes of the wireless sensing system 400 may refer to the tape nodes, other wireless devices, the gateway devices, client devices, servers, and other components of the wireless sensing system 400. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 415 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated or torn from a roll or sheet and adhered to an asset, or other stationary or mobile object (e.g., a structural element of a warehouse, or a vehicle, such as a delivery truck) or stationary object (e.g., a structural element of a building). In some embodiments wherein assets cannot have tape nodes directly adhered or affixed to them, tape nodes may be attached via a luggage tag or similar removeable mechanism. For example, in a hospital environment, assets such as a vacuum tool (e.g., a specialized vacuum pump) for vacuum-assisted closure, also referred to herein as a "WoundVac machine," or other large medical equipment may be rented. Because it is undesirable to adhere a tape node permanently or semi-permanently to rented assets, the tape nodes are instead adhered to a luggage tag, and the luggage tag is affixed without applying an adhesive. In other embodiments as discussed in conjunction with FIG. 7, the tape node has a luggage tag form factor and is affixed to the asset without an adhesive, by, for example, looping the tag around a portion of the asset. The process of separating or tearing a tape node from a roll or sheet activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment of wireless sensing system 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 410 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some embodiments, the client application 422 is installed on a mobile device (e.g., smartphone) that may also operate as mobile gateway 410. The client application 422 may cause the mobile device to function as a mobile gateway 410. For example, the client application 422 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 422) relays that data to the server 404 via cellular (2G, 3G, 4G, 5G) or Wi-Fi. Further, the client application 422 may cause the mobile device to establish a connection with, and receive pings (e.g., alerts to nearby assets that an environmental profile threshold has been exceeded), from the tape nodes or from the server 404. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 422 may share location data with the tape node, allowing the tape node to pinpoint its location.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment of wireless sensing system 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the wireless network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 459 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master or long range tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 6, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a parcel 426 and a shipping container 464) that are associated with multiple parcels or assets that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless sensing system 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment of wireless sensing system 400 to assist in connecting other tape nodes to the server 404. In some examples, the stationary gateway tape node 414 may be attached to a stationary structure (e.g., a wall) in the environment of wireless sensing system 400 with a known geographic location. In these examples, other tape nodes in the environment can determine their geographic location by querying the tape node or stationary gateway 414.

Figure 7A:
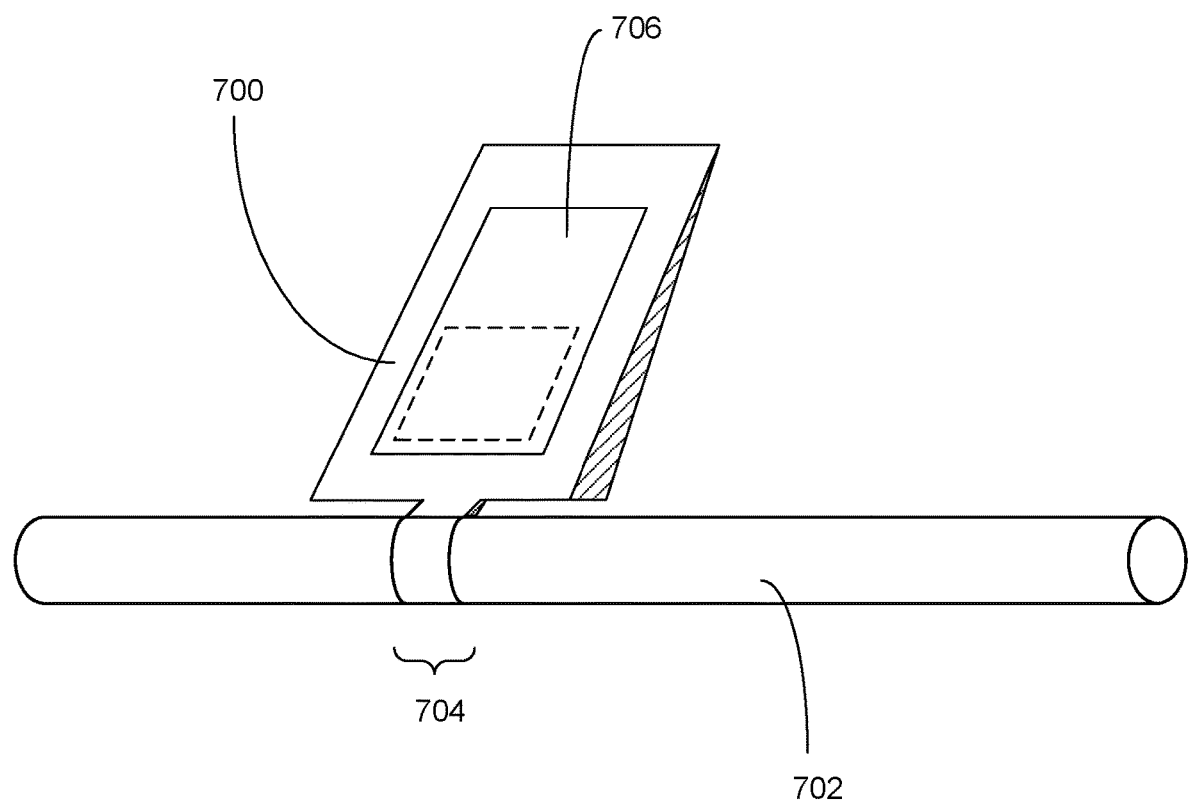
FIGS. 7A-C are diagrammatic views of a tape node affixed to an asset using a luggage tag configuration, in an embodiment.
Figure 7B:
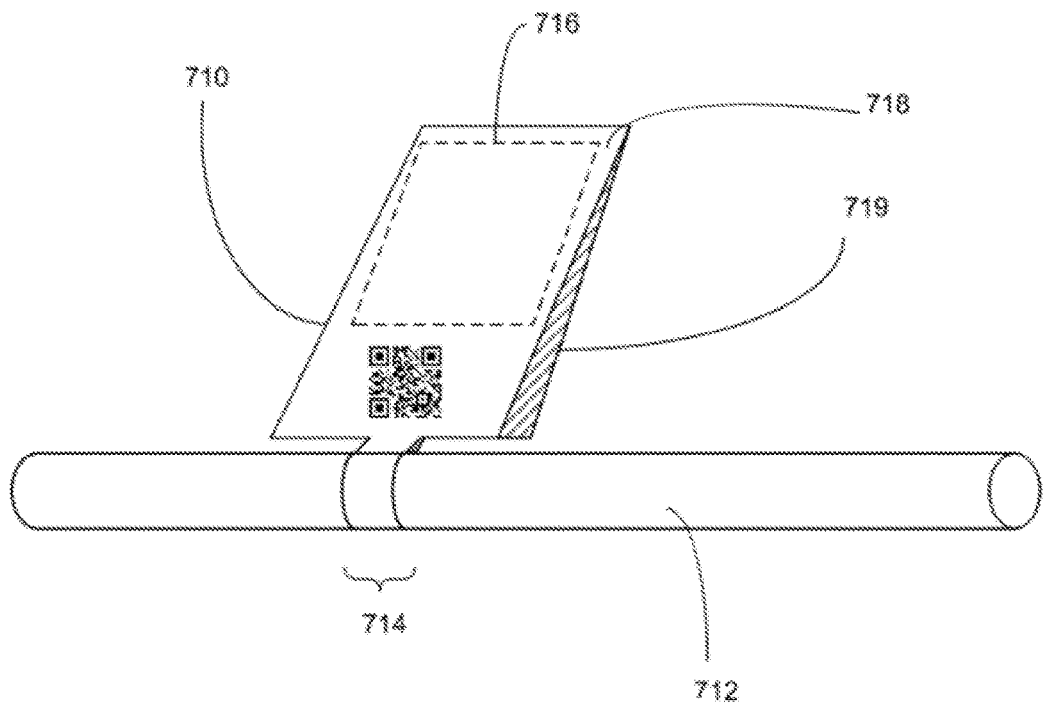

FIG. 7A is a diagrammatic view of a tape node affixed to an asset using a luggage tag configuration. As described in conjunction with FIG. 6, it may be desirable to affix a tape node to assets without the use of adhesives, e.g., if the asset is rented, shaped such that application of an adhesive would be difficult or prevent functionality of the asset, or the like. In these scenarios, a tape node 706 may be affixed to an asset 702 using a luggage tag 700 or similar configuration. In the example of FIG. 7, the luggage tag 700 comprises a flat portion on which the tape node 706 is adhered and a bendable portion 704 which may be affixed to a part of the asset 702. For example, the bendable portion 704 is affixed to a cable, railing, or other part of the asset 702. In some embodiments, the luggage tag 700 adheres to itself. In other embodiments, the luggage tag 700 comprises a mechanism such as a clasp or fastener. In some embodiments, the luggage tag 700 comprises a pocket into which a tape node 706 may be placed. In other embodiments, the tape node 706 is configured to incorporate the luggage tag configuration, e.g., instead of being a separate component, and comprises the bendable portion 704 to be affixed to an asset 702.

In other embodiments, the tape node itself has a luggage tag form factor. FIG. 7B is a perspective view of a tape node 710 with a first luggage tag form factor, according to some embodiments. The tape node 710 includes a first portion 718 connected to a second portion 719 by a connecting portion 714. In some embodiments, the connecting portion 714 has a width that is smaller than a width of the first portion 718 and a width of the second portion 719. The first portion 716 and the second portion 718 may include electrical components 716 (e.g., wireless transducing circuit 14) and one or more energy sources. In some embodiments, only the first portion 716 includes electrical components 716 and one or more energy sources. An adhesive side of the first portion 718 adheres to a side of the second portion 719, with the connecting portion 714 wrapping around the asset 712. In some embodiments, the second portion 719 includes an adhesive on the side that is adhered to the first portion 718. The connecting portion 714 does not have an adhesive on its exterior surfaces, according to some embodiments. In other embodiments, the connecting portion 714 may have an adhesive on a side that contacts the asset 712.

Figure 7C:
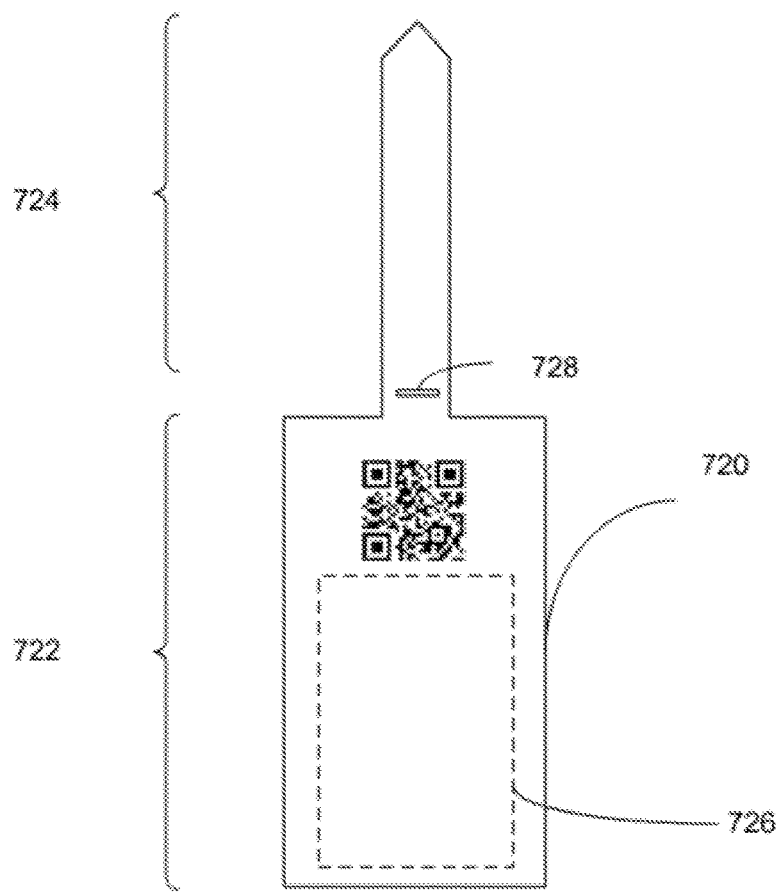

FIG. 7C is a top view of a tape node 720 with a second luggage tag form factor, according to some embodiments. The tape node 720 does not include an adhesive on its exterior surfaces. In other embodiments, some portions of the tape node 720 may include an adhesive on its exterior surfaces. The tape node includes a wide portion 722 and a narrow portion 724 that has a width smaller than a width of the wide portion 722. The wide portion includes electronic components 726 (e.g., the wireless transducing circuit 14). The tape node can be affixed to a portion of an asset without the use of an adhesive by wrapping or looping the narrow portion 724 around the portion of the asset. The tape node 720 may optionally include an aperture 728 for passing a part (e.g. the tip) of the narrow portion 724 through the aperture 728, to hold a loop of the narrow portion 724 around the portion of the asset In some embodiments, information describing an environment or assets in the environment are associated with tape nodes and gateway nodes deployed in an environment. The information may be associated with a unique identifier of the respective tape node or gateway node. The association may be stored in a database of the server 404. In some embodiments, the association is stored on a memory of the respective tape node or gateway node. In some embodiments, the association is stored on a memory of a client device (e.g., mobile gateway 410). The information may be manually registered upon deployment, e.g., being typed, scanned, or otherwise input by a user via a user device, or may be automatically registered, e.g., via a communications connection with a server, cloud, or other nodes of the wireless sensing system. For example, assets may be associated with barcodes or QR codes that, when scanned, identify an identifier, name, or type of the asset. Barcodes or QR codes may serve as pointers to entries in databases or data stores including information describing the asset. In another example, locations may be associated with pins on a map representation of the environment that may be automatically populated via GPS information upon deployment and manually confirmed by a user via a user device.

In a hospital environment, for example, green tape nodes, black tape nodes, and/or gateway nodes may be associated with a location upon deployment. Location information may include one or more of: a name of the location; a type or purpose of the location (e.g., patient room, storage room, sanitation area, hallway); GPS coordinates corresponding to the location; dimensions of the location; and the like. Further in a hospital environment example, white tape nodes, green tape nodes, or black tape nodes adhered or affixed to assets may be associated with information describing the asset. The information may be fixed or may be updated or changed over time. For example, fixed information may include an identifier or name of the asset; a type or purpose of the asset; a supplier of the asset; a date of purchase or acquisition; whether the asset is owned or rented; and the like. Information that may be updated or changed over time may include a status of the asset (e.g., in use, available for use, being repaired, etc.); a condition of the asset (e.g., new, in need of repair, in need of cleaning, etc.); a current image of the asset (e.g., a photo representing the asset's condition).

Hierarchical Wireless Communications Network

Figure 8:
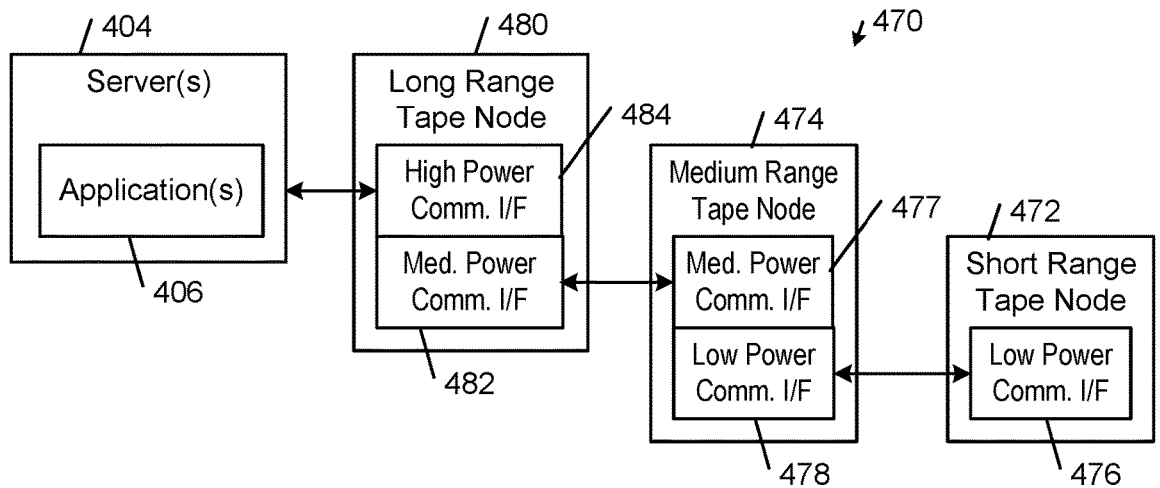
FIG. 8 is a diagrammatic view of a hierarchical communications network, in an embodiment.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 477, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the vehicle or mobile gateway 412 or the long range tape node as stationary gateway 414 adhered to an infrastructure component of the environment of wireless sensing system 400). In other examples, the master tape node processes the information contained in the received data packets and transmits the processed information to the server network node 404.

Figure 9:
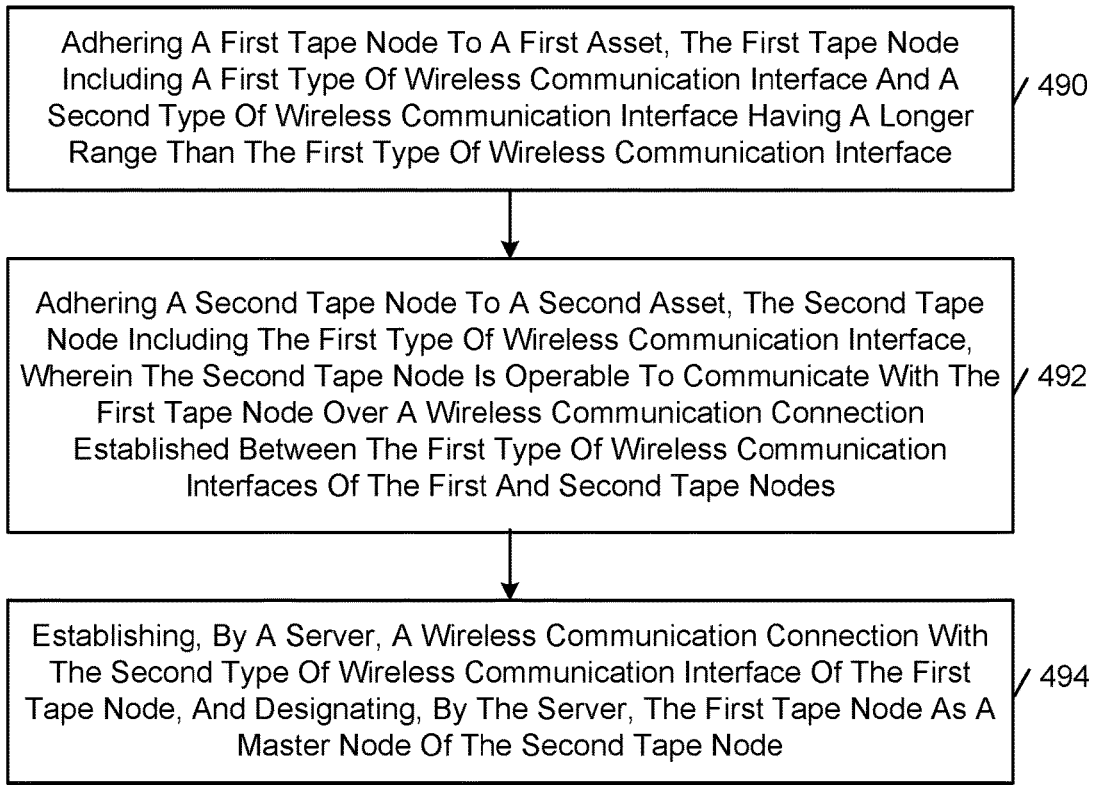
FIG. 9 is a flow diagram of a method of creating a hierarchical communications network, in an embodiment.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In some embodiments, the second tape node is assigned the role of the master tape node with respect to the first tape node.

Distributed Agent Operating System

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
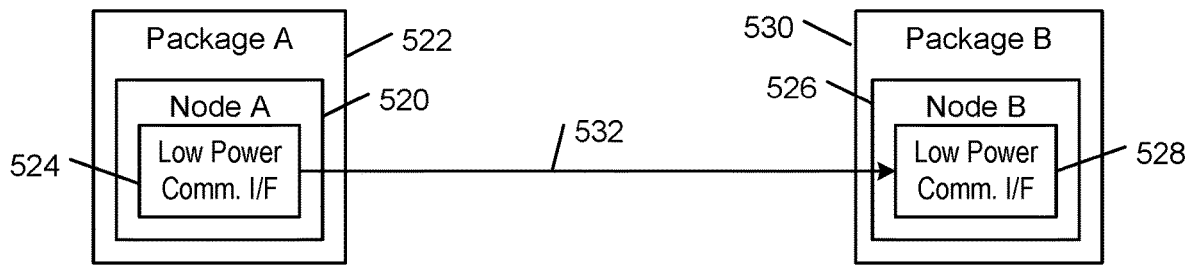
FIGS. 10A-10E are diagrammatic views of exemplary use cases for a distributed agent operating system, in an embodiment.

Referring to FIG. 10A, a node 520 (Node A) is associated with a package 522 (Package A). In some embodiments, the node 520 may be implemented as a tape node that is used to seal the package 522 or it may be implemented as a label node that is used to label the package 522; alternatively, the node 520 may be implemented as a non-tape node that is inserted within the package 522 or embedded in or otherwise attached to the interior or exterior of the package 522. In the illustrated embodiment, the node 520 includes a low power communications interface 524 (e.g., a Bluetooth Low Energy communications interface). Another node 526 (Node B), which is associated with another package 530 (Package B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
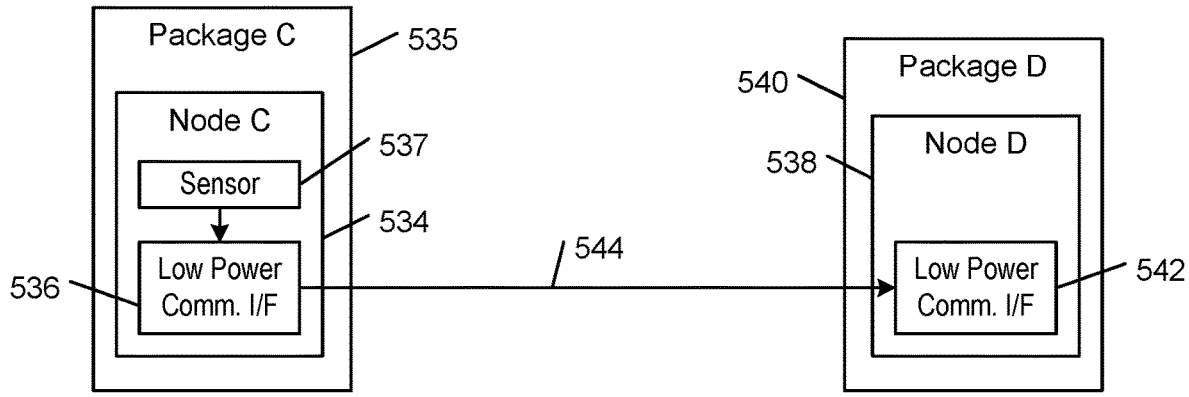

Referring to FIG. 10B, a node 534 (Node C) is associated with a package 535 (Package C). In the illustrated embodiment, the Node C includes a low power communications interface 536 (e.g., a Bluetooth Low Energy communications interface), and a sensor 537 (e.g., a temperature sensor). Another node 538 (Node D), which is associated with another package 540 (Package D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
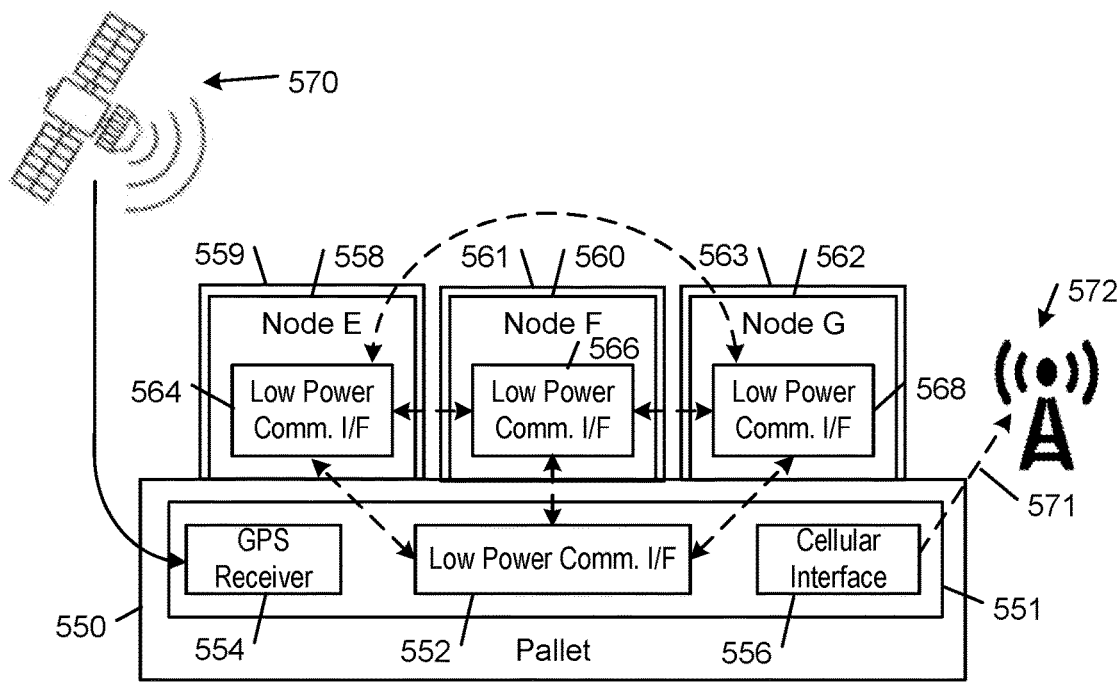

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing packages 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the packages 559, 561, 563 are grouped together because they are related. For example, the packages 559, 561, 563 may share the same shipping itinerary or a portion thereof. In an example scenario, the master pallet node 551 scans for advertising packets that are broadcasted from the peripheral nodes 558, 560, 562. In some examples, the peripheral nodes broadcast advertising packets during respective scheduled broadcast intervals. The master node 551 can determine the presence of the packages 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding packages 559, 561, 563 are intended to be grouped together (e.g., they share the same itinerary or certain segments of the same itinerary), the server authorizes the master node 551 to associate the peripheral nodes 558, 560, 562 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi-package group, the master node 551 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 558, 560, 562 include environmental sensors for obtaining information regarding environmental conditions in the vicinity of the associated packages 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the packages 559, 561, 563 from the master node 551 can be estimated based on the average signal strength of the advertising packets that the master node 551 receives from the respective peripheral node. The master node 551 can then transmit its own location and the locations of the package nodes E, F, and G to a server over a cellular interface connection with a cell tower 572. Other methods of determining the distance of each of the packages 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 to a cell tower 572.

In some examples, nodes are able to autonomously detect logistics execution errors if packages that are supposed to travel together no longer travel together, and raise an alert. For example, a node (e.g., the master node 551 or one of the peripheral nodes 558, 560, 562) alerts the server when the node determines that a particular package 559 is being or has already been improperly separated from the group of packages. The node may determine that there has been an improper separation of the particular package 559 in a variety of ways. For example, the associated node 558 that is bound to the particular package 559 may include an accelerometer that generates a signal in response to movement of the package from the pallet. In accordance with its intelligent agent program code, the associated node 558 determines that the master node 551 has not disassociated the particular package 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
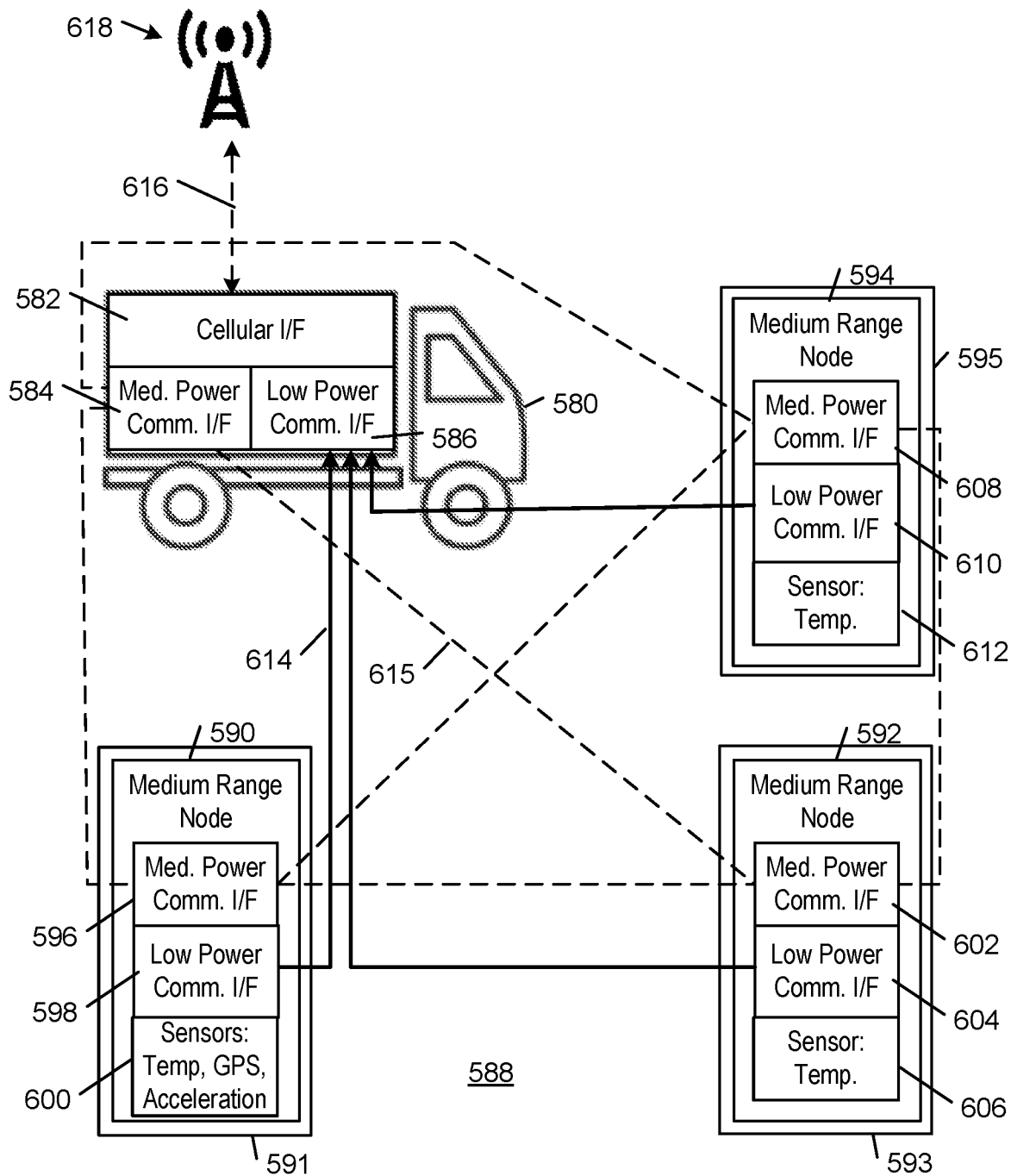

Referring to FIG. 10D, a truck 580 is configured as a mobile node or mobile hub that includes a cellular communications interface 582, a medium power communications interface 584, and a low power communications interface 586. The communications interfaces 582-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective containers 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the package nodes 590, 592, 594 and the truck 580 is connected to each of the other ones of the package nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., packages, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the medium power communications interface 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
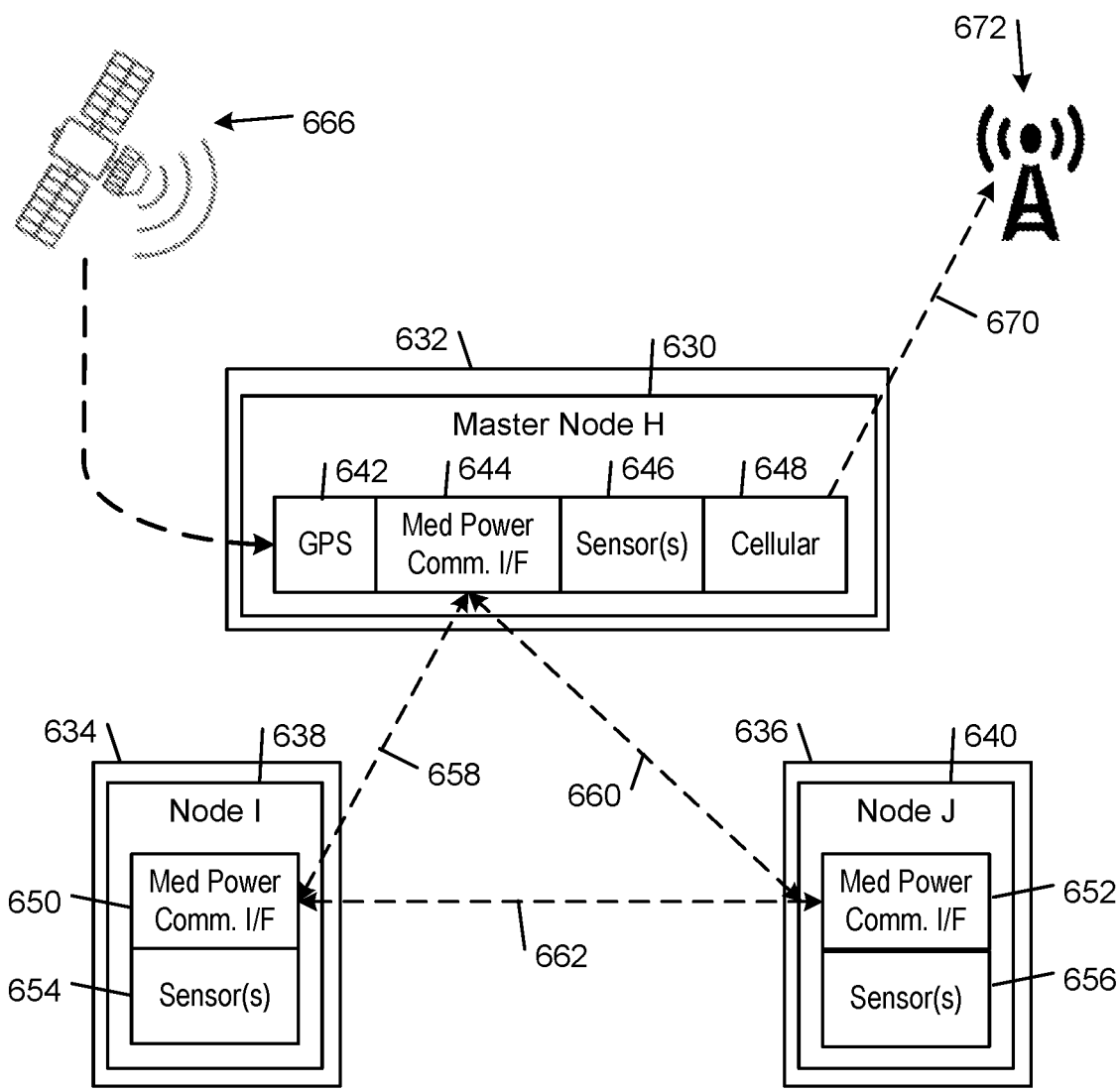

Referring to FIG. 10E, a master node 630 is associated with an item 632 (e.g., a package) and grouped together with other items 634, 636 (e.g., packages) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated packages 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that they are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the packages 634, 636 from the master node 630 can be estimated based on the average signal strength of the advertising packets that the master node 630 receives from the respective peripheral node. The master node 630 can then transmit its own location and the locations of the package nodes E, F, and G to a server over a cellular interface connection with a cell tower 672. Other methods of determining the distance of each of the packages 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes 638, 640 or the master node 630) sensor data to a server over a cellular communication path 670 to a cell tower 672.

Figure 11A:
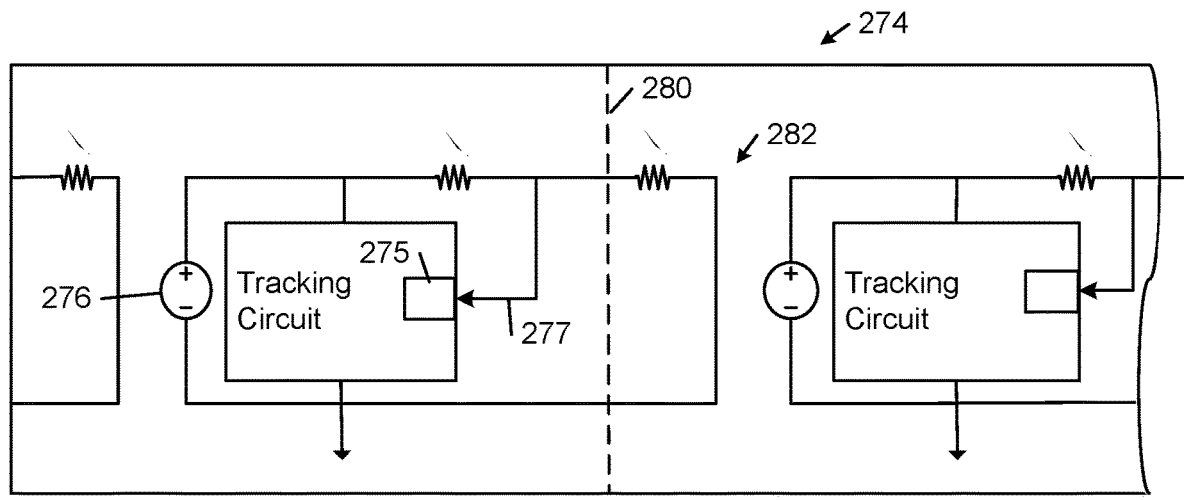
FIGS. 11A-11B are diagrammatic top views of a length of an example tracking adhesive product, in an embodiment.

Referring to FIG. 11A, in some examples, each of one or more of the tape nodes 270, 272 of a tracking adhesive product 274 includes a respective circuit 275 that delivers power from the respective energy source 276 to the respective tracking circuit 278 (e.g., a processor and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the tape node 270. In the illustrated example, this occurs when the user separates the segment from the tracking adhesive product 274, for example, by cutting across the tracking adhesive product 274 at a designated location (e.g., along a designated cut-line 280). In particular, in its initial, un-cut state, a minimal amount of current flows through the resistors $R_1$ and $R_2$. As a result, the voltage on the wake node 277 remains below the threshold turn-on level. After the user cuts across the tracking adhesive product 274 along the designated cut-line 280, the user creates an open circuit in the loop 282, which pulls the voltage of the wake node above the threshold level and turns on the wake circuit 275. As a result, the voltage across the energy source 276 will appear across the tracking circuit 278 and, thereby, turn on the tape node 270. In particular embodiments, the resistance vale of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more of the respective tracking circuit 278 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 11B:
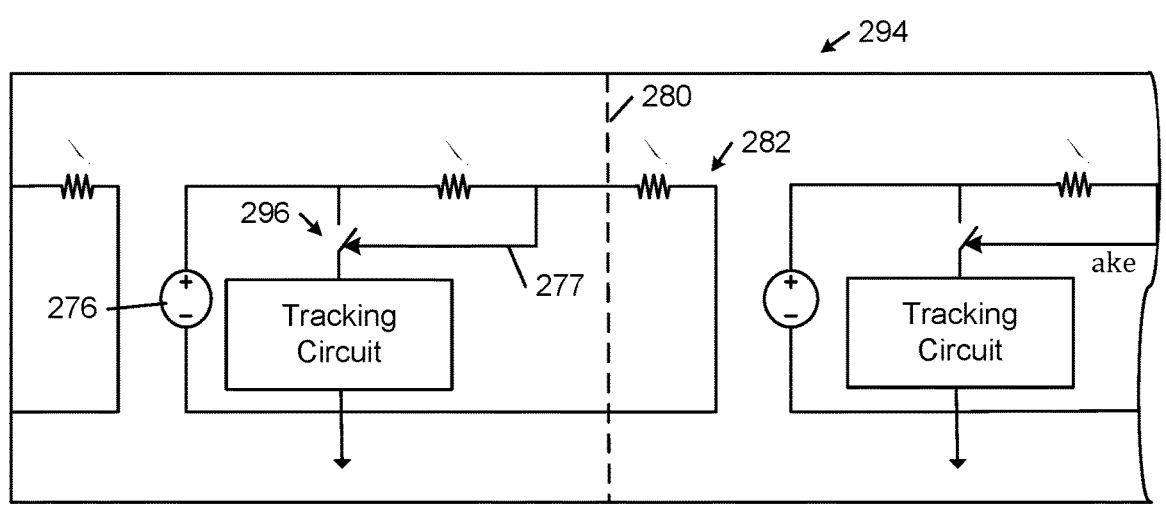

FIG. 11B shows another example of a tracking adhesive product 294 that delivers power from the respective energy source 276 to the respective tracking circuit 278 (e.g., a processor and one or more wireless communications circuits) in response to an event. This example is similar in structure and operation as the tracking adhesive product 294 shown in FIG. 11A, except that the wake circuit 275 is replaced by a switch 296 that is configured to transition from an open state to a closed state when the voltage on the switch node 277 exceeds a threshold level. In the initial state of the tracking adhesive product 294, the voltage on the switch node is below the threshold level as a result of the low current level flowing through the resistors $R_1$ and $R_2$. After the user cuts across the tracking adhesive product 294 along the designated cut-line 280, the user creates an open circuit in the loop 282, which pulls up the voltage on the switch node above the threshold level to close the switch 296 and turn on the tracking circuit 278.

Locating and Filtering Assets in an Environment

In environments having a large number of mobile assets, it is often difficult to manage and optimize use of assets throughout the environment. For example, hospital and other business environments often include one or more buildings, wards, or areas, as well as having a large number of assets that are moved around the environment for use, maintenance, or storage. Additionally, assets may have different characteristics, such as being reusable, consumable, or disposable; being stationary when in use; requiring different storage or sanitation procedures; and the like. In busy environments, assets may be become lost or misplaced, or may be difficult to locate when they are needed, causing a negative impact on productivity and efficiency of users in the environment. As used herein mobile assets may refer to assets that move several times a day or infrequently, such as once a month or less.

When mobile assets are not in use, they may have common identifiable characteristics, such as being placed in a storage facility (onsite or offsite), experiencing particular conditions, and the like. It is valuable to accurately identify mobile assets that are not in use or are available for use so that they may be quickly located when the need arises, may be moved to areas where they are more likely to be used, or may otherwise be optimally handled. The wireless sensing system enables users of the wireless sensing system to request current information on assets that may be spread across multiple buildings, wards, or other areas of a business or hospital environment, as well as to optimize and manage assets and personnel in the environment.

As described above, adhesive tape platforms (also referred to herein as "tape nodes") can be used to implement a low-cost wireless network infrastructure for performing monitoring, tracking, and other asset management functions relating to mobile assets in an environment, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities. In embodiments, tape nodes may be described as being associated with a mobile asset that moves several times a day or infrequently, such as once a month or less.

Figure 12:
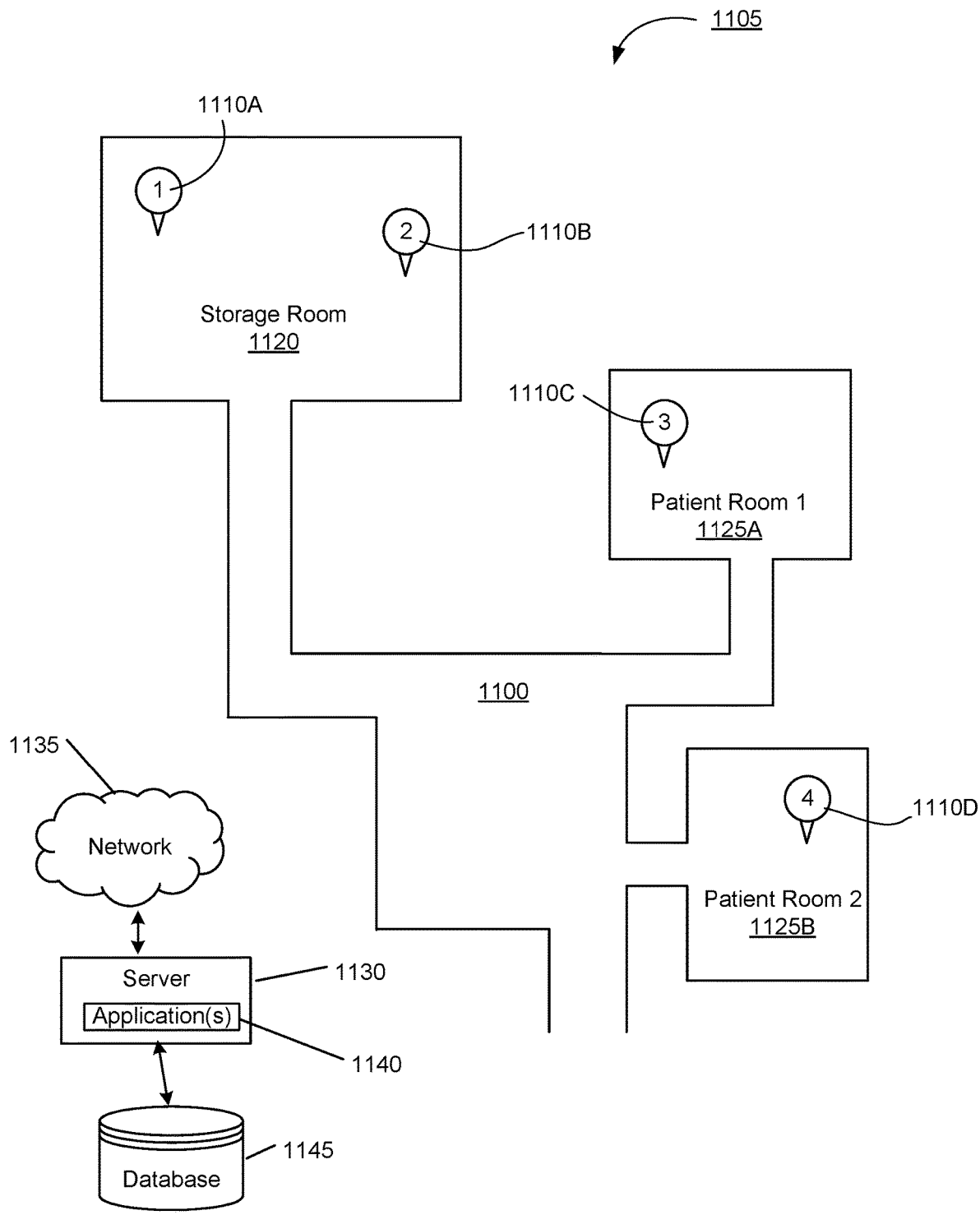
FIG. 12 is an example illustration of an environment including a wireless sensing system and a plurality of assets, in an embodiment.

FIG. 12 is an example illustration of a hospital environment 1100 implementing a wireless sensing system 1105 according to the principles described above for wireless sensing system 400 of FIG. 6. Hospital environment 1100 includes several locations, such as storage room 1120, a first patient room 1125A and a second patient room 1125B. These locations are for purposes of illustration only and hospital environment 1100 may include additional locations and other types of locations, such as offices and nurse stations. Hospital environment 1100 may include a number of mobile assets 1110A, 1110B, 1110C and 1110D, such as IV stands, beds or other equipment. In the hospital environment 1100, it may be imperative for nurses, doctors, or other users to locate assets 1110A-1110D as quickly as possible. In particular, it is important for the assets 1110A-1110D to be available for use (e.g., not currently in use by another patient), clean, and accessible. The wireless sensing system 1105 as disclosed herein is configured to identify, locate, and filter assets in the environment 1100 quickly and provide the information to users of the wireless sensing system.

In an aspect, the wireless sensing system 1105 comprises a plurality of white tape nodes associated with assets in the business or hospital environment and a plurality of gateway and green tape nodes associated with locations in the business or hospital environment. A white tape node may also be referred to as a short range tape node as shown in FIG. 5A. A green tape node may also be referred to as a medium range tape node as shown in FIG. 5B. In some embodiments, a green and/or black tape node is associated with an asset. A black tape node may also be referred to as a long range tape node as shown in FIG. 5C. In some embodiments, a white tape node and/or a black tape node is associated with a location. As discussed in conjunction with FIG. 6, each white tape node of the plurality of white tape nodes is associated with a name or identifier of a respective asset 1110A-1110D, as well as other information about the respective asset, such as an asset type, an asset function, an asset status, an asset condition, and the like. Each gateway or green tape node is associated with a location of the node, e.g., a room or area of the environment such as storage room 1120, patient room 1125A, and patient room 1125B. The white tape nodes are configured to communicate with the gateway and green tape nodes.

Mobile assets 1110A-1110D communicate wirelessly with server 1130 over network 1135. One or more applications 1140 in server 1130 determine, based on information captured by the white tape nodes and/or the gateway and green tape nodes, current conditions and locations of each asset of the environment. Captured and calculated information is stored, for example, in database 1145 and used to create a map of asset locations and conditions for access by users of wireless sensing system 1105.

In embodiments, a tape node may capture sensor data associated with respective assets and determine, based on the sensor data using a sensor or transducer of the white tape node, a status or condition for the respective assets. The tape nodes may comprise one or more of: accelerometers, light sensors, acoustic sensors, magnetometers, other sensors, and the like. Based on captured sensor data, the tape nodes may determine whether the asset is currently in use. For example, the tape nodes comprise an accelerometer and determine that the asset is in use responsive to data indicating movement of the asset. In another example, the tape nodes comprise light sensors and determine that the asset is in use responsive to data indicating exposure to light (e.g., as being in a lit area such as a patient room rather than being in a dark area such as a storage room) or exposure to particular wavelengths of light. In another example, the tape nodes comprise acoustic sensors and determine that the asset is in use responsive to detecting a threshold amount of noise or a pattern of sound (e.g., beeping corresponding to a heart monitor). In another example, tape nodes comprise a magnetometer and determine that the asset is in use responsive to detecting a current flowing through a wire, or the tape nodes comprise an inductive sensor that detects a change in inductance in proximity to the wire. In another example, tape nodes comprise pressure sensors and determine that the asset is in use responsive to detecting air pressure or water pressure through a faucet, tube, or the like. Pressure data may be used to detect whether an asset is in use and to detect leaks, e.g., if water is detected flowing through a faucet in a room where it should not be. In some examples, a tape node comprises a vibration sensor and detects flow or leaks by detecting characteristic vibrations.

In some embodiments, one or more computations are performed by white tape nodes, e.g., such that computational resources are distributed through the nodes of the wireless sensing system. In other embodiments, white tape nodes transmit captured sensor data to one or more gateway or green tape nodes and one or more computations are performed by the gateway or green tape nodes. For example, one or more gateway or green tape nodes determine a current location of assets corresponding to white tape nodes based on a signal strength of a communication from the white tape nodes. Based on the current location of the assets, the gateway or green tape nodes determines whether the assets are in use. In an example, an asset having a current location corresponding to a storage room is determined as being not in use and available for a user, based on correlating the storage room location with assets that are not in use. In contrast, an asset having a current location corresponding to a patient room or as being within a threshold distance of a patient bed is determined as being in use or unavailable. An asset having a current location corresponding to a sanitation or cleaning area is determined as being not in use but unavailable due to undergoing cleaning processes. A first mobile asset having a current location within a threshold distance of a second asset, e.g., an IV pump being within 2 feet of a hospital bed, is determined as being unavailable and in use, according to some embodiments. The second asset may also have an associated tape node that communicates with the tape node of the first asset to determine that the second asset is within the threshold distance of the first asset.

In some scenarios, current location data of an asset may be inconclusive. For example, it may be difficult to determine whether a first asset is associated with a second asset (e.g., in use by a patient using the second asset) or a third asset if it is equidistant between the second and third assets. For example, IV pumps may be commonly associated with or assigned to hospital beds by the wireless sensing system 400, and an IV pump may be equidistant between two hospital beds. In cases where assets are likely to be assigned to or associated with other assets (e.g., IV pumps or IV trees are likely to be assigned to hospital beds), the wireless sensing system 1105 communicates with other white tape nodes within a threshold distance of the first asset and, based on a number and locations of other white tape nodes within the threshold distance, determines a most likely asset for the first asset to be associated with. For example, if assets C, D, and E are assigned to asset B and are all within a threshold distance of asset A, it is likely that asset A is also assigned to asset B. In another example, if asset B is in use in a first room and no assets are detected as being in use in a second room, asset A, whose location is ambiguously between the first room and the second, is most likely in use in the first room and assigned to asset B. The wireless sensing system, in this case, assigns/associates asset A to asset B and the first room. In another example, the wireless sensing system may resolve inconclusive data based on purposes or types of assets. A hospital bed, for example, is determined to be located in a patient room rather than in an office room, when there is ambiguity about its location. The wireless sensing system 400 may determine that the hospital bed is in the patient room based on its location (e.g., on or near an edge of the patient room) and a probability of the hospital bed being associated with the office room. The probability may be predetermined and input to the wireless sensing system 400 by a user, or it may be determined by other methods, e.g., by use of a machine learning model.

In some embodiments, the wireless sensing system 1105 may use proximity between tape nodes associated with mobile assets to detect when an asset in a group of assets is missing. For example, white tape nodes may be associated with each tool in a set of surgical tools. Responsive to tool A having a different current location than tools B, C, and D, the wireless sensing system may flag tool A as being misplaced. In some embodiments, the wireless sensing system transmits a notification to one or more user devices to locate tool A and move it to the current location of tools B, C, and D. In other embodiments, the wireless sensing system updates data associated with a barcode or QR code of tool A, such that when the barcode or QR code of tool A is scanned, information or notification is provided to relocate tool A to the current location of tools B, C, and D. For example, a user scanning the barcode of tool A may be notified on a client device to relocate tool A to a location where tools B, C, and D are currently located.

In some embodiments, white tape nodes may use captured sensor data to identify events occurring in the environment. In an example in a hospital environment, white tape nodes may use acoustic sensor data to identify an acoustic alarm (e.g., a heart monitor beeping) in patient rooms. The white tape nodes identify an event type and, in some embodiments, determines a priority level for the event. Information about the event is transmitted to a gateway or green tape node, a server or cloud of the wireless sensing system, or a user device of a user of the wireless sensing system. In some embodiments, gateway or green tape nodes, servers or clouds of the wireless sensing system, and user devices are configured to filter or rank events based on urgency, type, priority, or other factors. This ensures that users in the environment are able to quickly view, access, and address urgent events without the need to manually evaluate and prioritize emergent events.

In an aspect, wireless sensing system 1105 additionally comprises one or more user devices. The user devices are, for example, smartphones, smart watches, wristbands, laptop or desktop computers, or other computing devices. In some embodiments, user devices are tape nodes adhered or affixed to a badge or item of clothing. The user devices are configured to communicate with the wireless sensing system and to display to a viewing user an interface for managing assets in the environment.

In other embodiments, users of the wireless sensing system may manually update or capture information about conditions and statuses of assets. For example, users of the wireless sensing system may press a button, scan a QR code or barcode associated with an asset, interact with an interface, or perform some other interaction using a user device when the asset is in use, when the asset is no longer in use, or when the asset is otherwise changing status or condition. In an embodiment, the user device communicates the information to a server or computing system of the wireless sensing system. Either or both of the server and the computing system may be implemented on site or remotely, such as in the cloud. The server or computing system of wireless sensing system 1105 may further distribute the information to one or more gateway or green tape nodes or to one or more white tape nodes. In another embodiment, the user device communicates the information to a gateway or green tape node or to a white tape node associated with the mobile asset.

In an embodiment, wireless sensing system 1105 is configured to receive requests for information about assets from the user devices. For example, requests may include a request to locate a nearest asset of an asset type or asset function; a request to view a summary of usage for assets of an asset type; a request to view usage or a current location of a specific asset; a request to perform an optimization computation for one or more assets or areas; or the like.

In some embodiments, the wireless sensing system is configured to track and monitor sets of items in or on a container, e.g., vials or other small objects, using RFID tags. In these embodiments, gateway and green tape nodes associated with locations in an environment have RFID/RF capabilities, such that the RFID/RF-capable gateways are operable to scan assets having RFID/RF tags as the assets pass the gateways, as described below with respect to FIGS. 13A and 13B.

Figure 13A:
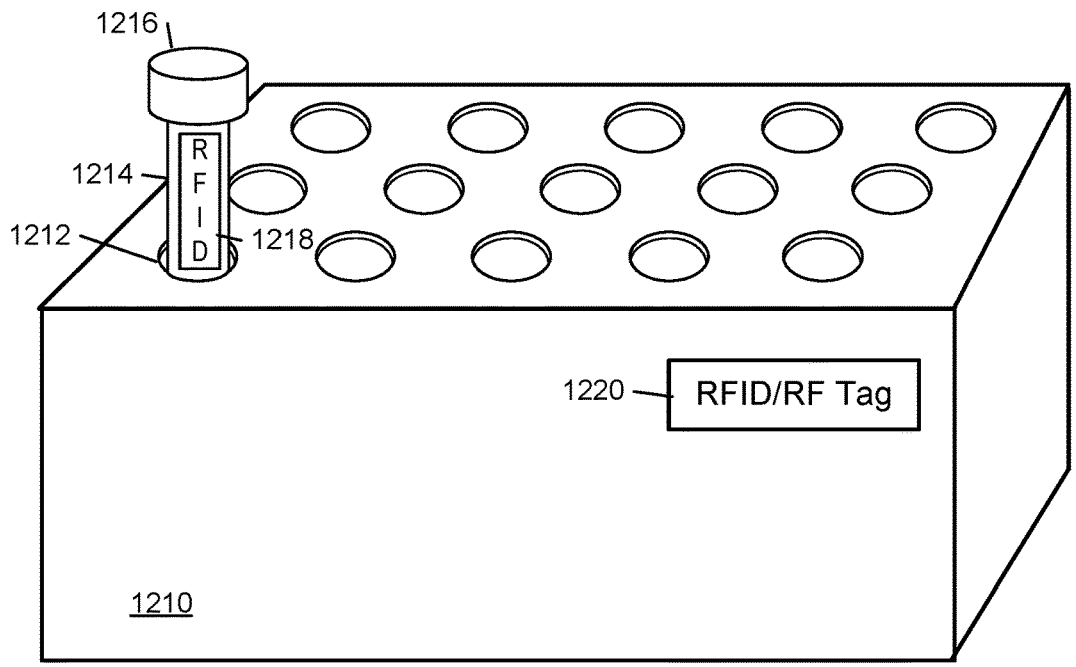
FIGS. 13A-13B are example illustrations of a wireless sensing system having RFID/RF capabilities, in an embodiment.

FIG. 13A shows a diagrammatic perspective view of a specimen sample bin 1210 that includes a plurality of slots 1212 for receiving vials 1214 (also referred to herein as "specimen sample holders"). The vial 1214 shown in FIG. 13A includes a stopper 1216 and an RFID tag 1218. In the illustrated example, the vial 1214 may be any type of suitable container, including glass or plastic vials. The RFID tag 1218 on the vial 1214 may be any type of active or passive RFID tag. An active RFID tag has an internal power source for transmitting a unique identifier stored in memory, whereas a passive RFID tag responds to a radio frequency (RF) interrogation signal by transmitting the unique identifier stored in a memory device embedded in the tag. The specimen sample bin 1210 also includes a RFID/RF tag adhered to a side wall of the specimen sample bin 1210. The RFID/RF tag 1220 includes an RFID circuit and a radio frequency (RF) circuit. In some examples, the radio frequency (RF) circuit is a Bluetooth® Low Energy communications circuit. In other embodiments, the RFID/RF tag 1220 is replaced by an RF tag (e.g., a Bluetooth® LE communications tag wireless tag).

Figure 13B:
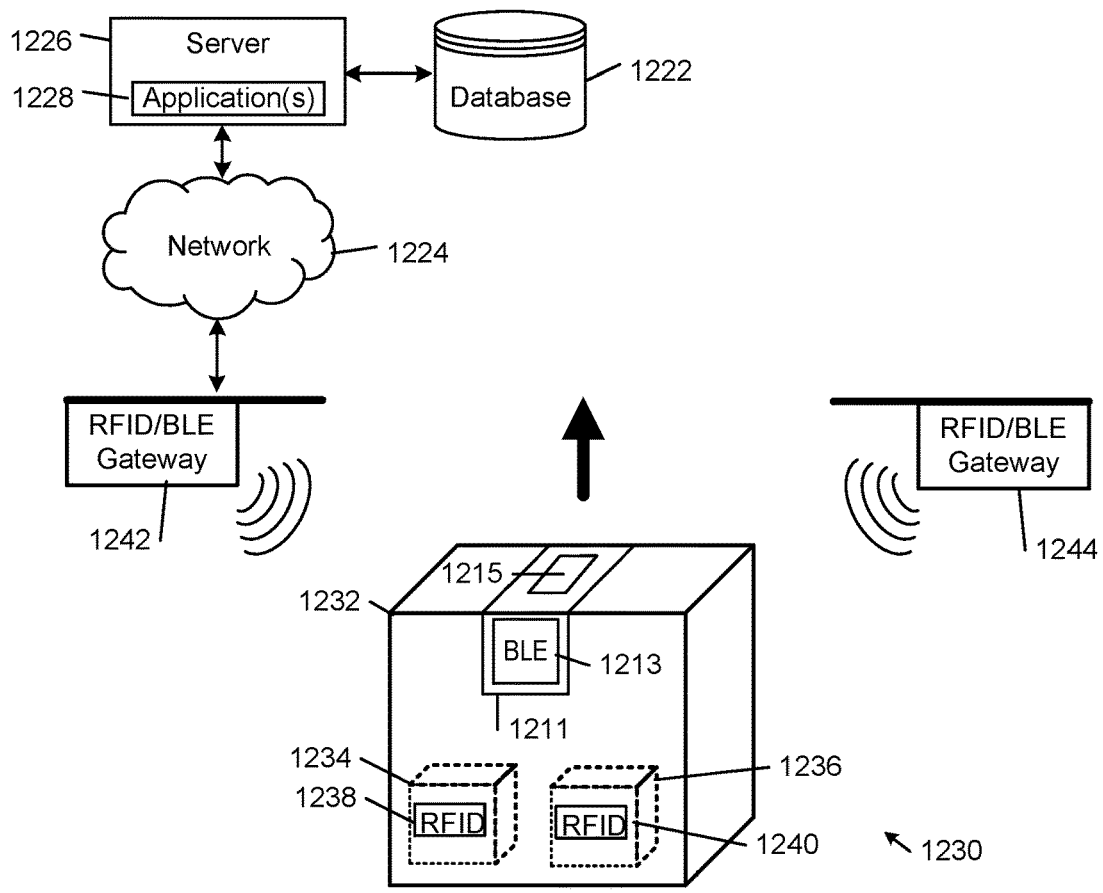

FIG. 13B shows an example system 1230 for reading and correlating identifiers relating to an asset 1232. In the illustrated embodiment, the asset 1232 contains multiple logistic containers or assets 1234, 1236 (e.g., boxes) that are marked with respective RFID tags 1238, 1240, where each of the assets 1234, 1236 holds one or more logistic containers. In the illustrated embodiment, the asset is sealed with an adhesive tape product 1211 that includes an embedded wireless Bluetooth® Low Energy (BLE) communications component 1213 and an embedded RFID component 1215. As the asset 1232 passes between a set of RFID/RF gateways 1242, 1244, each asset 1232, 1236, 1240 is scanned by one or both of the RFID/RF scanners in gateways 1242, 1244 to ascertain the wireless tag identifiers of all the assets 1232 and boxes that pass between the gateways.

In other embodiments, the assets 1234, 1236 are carried on a pallet or other container as shown, for example, in FIG. 6, instead of being contained in the asset 1232. In these embodiments, a RFID/RF tag 1220 is affixed to the pallet or other container and RFID tags 1218 are affixed to the assets 1234, 1236. In some embodiments, a single RFID/RF tag or a RF tag is used to identify the logistic container in or on which are grouped logistic entities that are individually labeled with RFID tags.

In an embodiment, the RF scanner components of the gateways 1242, 1244 are implemented by a Bluetooth® Low Energy (BLE) communications devices. The gateways 1242, 1244 are operable to read and correlate the scanned RFID and BLE identifiers stored in the memories of the RFID/BLE tags. The gateways 1242, 1244 transmit the identifiers of the scanned assets and boxes over a network 1224 to a server 1226, which is operable to detect if there are any assets or boxes that are missing and detect if there are any additional assets or boxes that are not listed in the database 1222. In this process, the server application 1228 compares the identifiers (IDs) of the assets and boxes as they were entered into the database 1222 during loading with the asset and box IDs that are scanned by the RFID/RF gateways 1242, 1244. If the server application 1228 does not detect all of the vials or bins that were listed in the database, or if the server application 1228 detects any unknown identifiers of any boxes or assets that are not listed in the database 1222, the server application 1228 is operable to raise an alarm.

Figure 14:
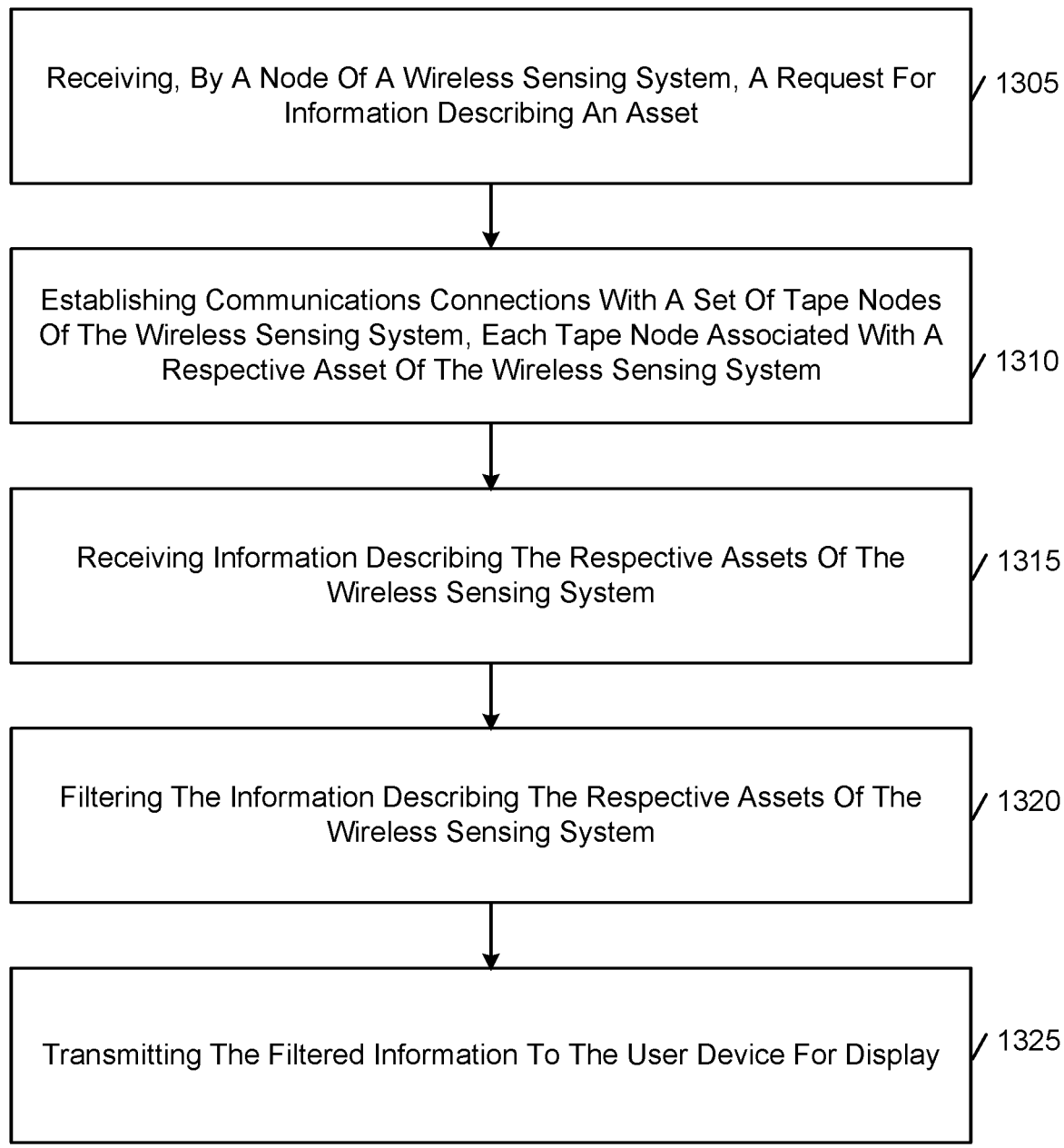
FIG. 14 is a flow diagram of a method for managing assets of an environment via a wireless sensing system, in an embodiment.

FIG. 14 is a flow diagram of a method for managing assets of an environment via a wireless sensing system (e.g., the wireless sensing system 400). A node of the wireless sensing system, such as a gateway node or green tape node, receives a request for information describing an asset (FIG. 14, block 1305). For example, a node in a hospital environment receives a request by a user to locate a nearest available IV tree. The node establishes communication connections with a set of white tape nodes of the wireless sensing system (FIG. 14, block 1310). Each white tape node is associated with a respective asset. For example, each white tape node is associated with an IV tree. The node of the wireless sensing system receives information describing the respective assets (FIG. 14, block 1315). The information may include, for example, sensor data captured by the white tape nodes, a current location of the respective asset, a current status of the respective asset, a current condition of the respective asset, and the like. In some embodiments, the node performs one or more computations based on the received information. The node filters the information describing the respective assets based on the received request (FIG. 14, block 1320). For example, the filtering may be based on whether a respective asset is available for use. In an embodiment, the node transmits the filtered information to the user device for display (FIG. 14, block 1325). In other embodiments, node transmits the filtered information to a cloud or server of the wireless sensing system. The cloud or server then communicates the filtered information to the user device for display.

In other embodiments, the method may include additional, fewer, or different steps, and the steps may be performed in a different order. In other embodiments, steps of the method may be performed by different components of the sensing system. For example, in other embodiments, the user device communicates the requests to a server or cloud of the wireless sensing system. The server or cloud of the wireless sensing system then communicates the request to a gateway or green tape node, e.g., selecting the gateway or green tape node based on a current location of the user, a current location of the gateway or green tape node, or other factors. In another example, in other embodiments, the filtering may be performed by an intermediate node or the cloud or server of the wireless sensing system.

Optimizing Assets, Performance, and Nodes in an Environment

Information captured by tape nodes and gateway nodes of the wireless sensing system may additionally be used to optimize asset distribution and management, as well as to evaluate and optimize performance of staff, human operators, and/or users. Information captured by tape nodes and gateway nodes may additionally be used to develop an analysis of the use of the mobile assets and optimize deployment of additional nodes to ensure that an infrastructure of the wireless sensing system is able to capture all desired areas of an environment.

A method of managing mobile assets in an environment using a wireless sensing system includes deploying white tape nodes each associated with a respective mobile asset, deploying green or gateway tape nodes each associated with a location in the environment performing an initial scanning operation to establish communication connections between the white and green or gateway nodes with the wireless sensing system, building a map of the mobile assets in the environment, and performing subsequent scanning operations to identify a location for respective mobile assets.

White nodes may communicate with one or more of the green or gateway tape nodes to determine their location.

Deployment of a white tape node may include attaching the tape node to a mobile asset, initializing the tape node, entering identifying information about the mobile asset into the tape node, and causing the tape node to ping a tape node of the second plurality of tape nodes to determine its location.

In some embodiments, the wireless sensing system 1105 or 1230, for example, is configured to optimize distribution and paths of mobile assets. A mobile asset is an asset that may change locations. According to some embodiments, a mobile asset is an asset that changes locations with a frequency above or equal to a threshold frequency value (e.g., once a week). Mobile assets are associated with a white tape node or other type of node. In contrast, a stationary asset is an asset associated with a fixed location or an asset that changes location with a frequency of less than a threshold frequency value. For example, stationary assets may be large CT, CAT, or x-ray machines having a fixed location in an environment, or may be hospital beds associated with long-term care that are moved infrequently. Stationary assets may be associated with a white, green, or black tape node or gateway node.

In an embodiment, the wireless sensing system captures information describing movement of the mobile asset during a period of time (e.g., a day) and determines, based on interactions by the white tape node with other node of the wireless sensing system, an optimal path for the mobile asset. For example, in a hospital environment, IV pumps or IV trees may be visiting assets that move between rooms of the hospital. The wireless sensing system generates a graph or bell curve representative of a throughput or number of device interactions by a white tape node associated with IV pumps or IV trees. Based on the respective locations of the device interactions and the durations of time of the device interactions, the wireless sensing system may determine an optimal path for the IV pump or IV tree, or may reallocate additional or other assets to reduce the required movement of the IV pump or IV tree.

In another embodiment, the wireless sensing system captures information describing movement of the mobile asset over time and determines one or more optimal locations for the mobile asset while not in use. For example, if an asset (e.g., a hospital bed) is most often used in a first area of the environment (e.g., the ICU), the wireless sensing system may allocate the asset to be stored in a storage area closest to the first area of the environment, such that the asset is easily accessible when a need for the asset arises. In some examples, assets may be allocated between areas or groups of areas. Similarly, in another example, the wireless sensing system determines one or more optimal arrangements for storage areas, e.g., such that assets that are used more frequently are more easily accessible than assets that are used infrequently. Asset usage may be determined based on frequency of movement of the asset from the storage area, time duration that the asset is determined by one or more nodes of the wireless sensing system as being in use, and the like.

In another embodiment, the wireless sensing system is configured to detect events such as asset failures or conditions that may be hazardous to the functionality or quality of assets. As described previously, white tape nodes associated with assets may comprise sensors capturing data describing the asset or conditions surrounding the asset. In addition to sensor data being used to determine when assets are in use, are available for use, or are being repaired, cleaned, or are otherwise unavailable, sensor data may be used to determine when assets experience events and whether action should be taken to address the events. For example, white tape nodes may include temperature sensors and may identify an event when temperature data corresponding to an asset exceeds a threshold value. The threshold value may be a default value above or below room temperature or may be a specified value at which the asset is at risk of malfunction or degradation, e.g., if the asset includes liquid, risk of malfunction may occur at freezing or boiling points. In another example, white tape nodes may include accelerometers and may identify an event when acceleration data exceeds a threshold value or corresponds to a fall.

In another embodiment, the wireless sensing system is configured to detect and validate contact between assets and users. In further embodiments, the wireless sensing system validates protocols and procedures associated with the assets and/or locations of the hospital or business environment. In some embodiments, white tape nodes associated with assets are configured to communicate with one or more user devices within a threshold distance. Based on a duration of a communication connection being established between white tape nodes and user devices, the wireless sensing system determines a duration of time wherein the asset is in use by the user of the user device. In some embodiments, the wireless sensing system may compute and provide information describing efficiencies of staff and/or human operators with assets in the environment. An efficiency of a staff member and/or human operator may be based on an amount of time a user and/or human operator spends on a task associated with an asset (e.g., more time spent on the task, the lower the efficiency of the staff member and/or human operator). Efficiencies of staff members and/or human operators in the environment may be used as a proxy for the health and management of the environment. In an example, a user efficiency may be determined based on an amount of time passing between a user submitting a request to locate an asset and the user interacting with the asset. In other embodiments, the wireless sensing system may determine whether users adhere to protocols and procedures associated with the asset or the environment. For example, the wireless sensing system may determine that a user does not adhere to a cleaning protocol for an asset if the cleaning protocol requires that a cleaning solution be applied for 10 minutes if a user is detected to interact with the asset for only 5 minutes. In another example, the wireless sensing system may determine that one or more users do not adhere to protocols for social distancing if multiple users interact with an asset simultaneously rather than sequentially. In another example, the wireless sensing system may determine that a new protocol to store unused equipment in a new location is not being adhered to responsive to unused equipment being consistently placed in a previous storage location.

In another embodiment, the wireless sensing system is configured to track a history of contact of assets between users. For example, in a hospital environment, it is valuable to know whether assets are in contact with potentially contagious patients, nurses, or doctors. A hospital bed may be flagged as requiring sanitation, for example, if it has come into contact with a contagious patient. The wireless sensing system may additionally flag other assets or users having shared a location with the hospital bed (e.g., nurses having served in a contagious patient's room; an IV pump or medical equipment having been used in the contagious patient's room) such that a potential contagion may be quickly identified and addressed.

In another embodiment, the wireless sensing system is configured to optimize the configuration, including the placement, of nodes in the environment. In order for the wireless sensing system to function effectively and to provide accurate information describing assets in the environment, it is vital for nodes to be correctly deployed throughout the environment. Missing nodes, for example, may result in areas of the environment without connection, in which white tape nodes may be unable to establish communications with gateway or green tape nodes. In an embodiment, a user interface of the wireless sensing system draws concentric circles around each gateway or green tape node deployed in an environment. The wireless sensing system directs users to place additional nodes in areas wherein concentric circles have gaps or do not overlap.

User Interface for Asset Management and Performance Optimization

Figure 15B:
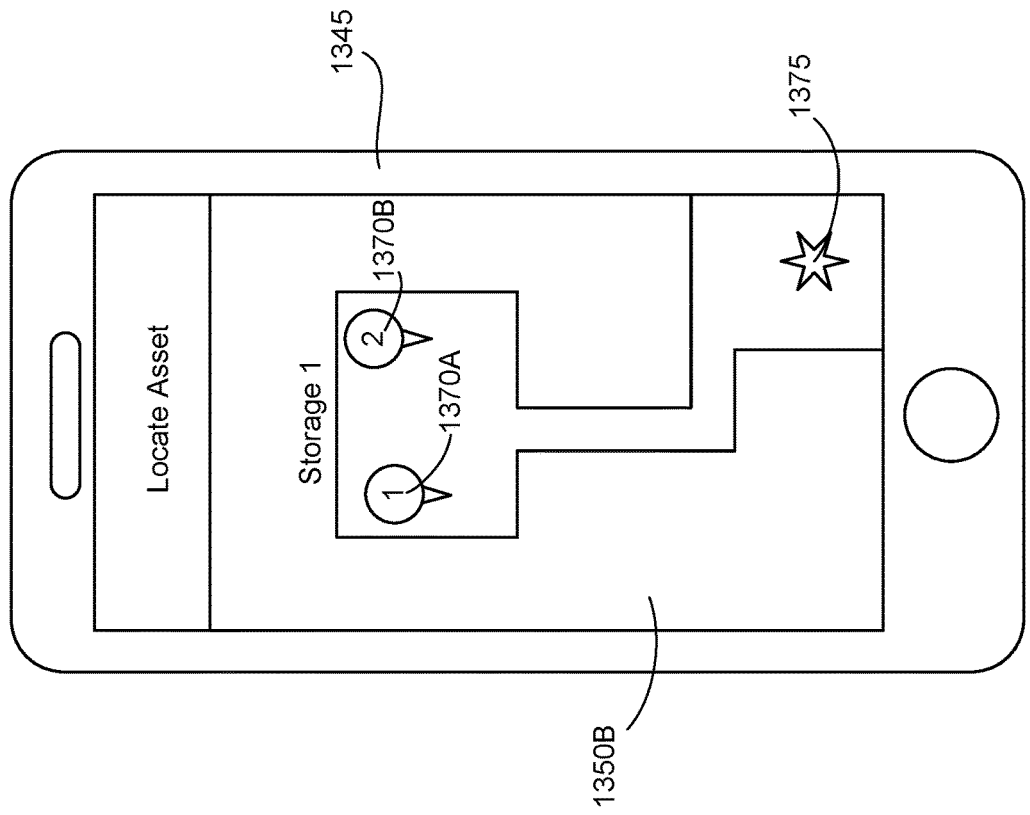
FIGS. 15A-15B are example user interfaces for guiding users of a wireless sensing system to assets in an environment, in an embodiment.
Figure 15A:
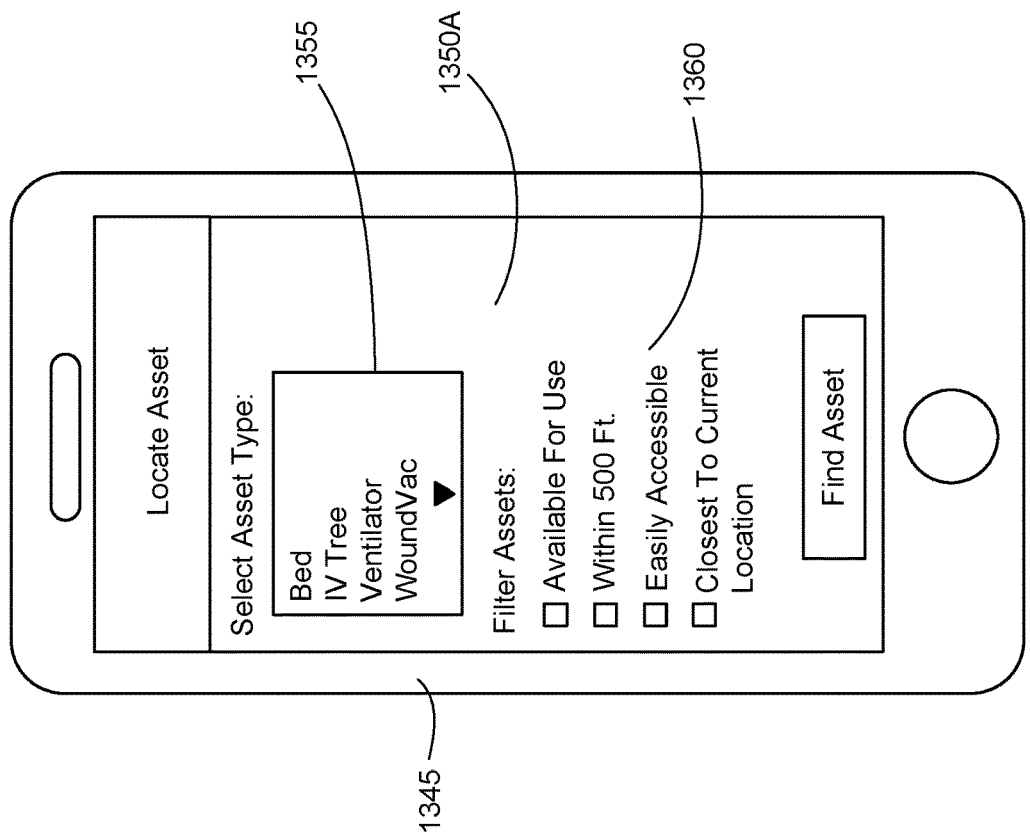

FIGS. 15A-15B are example user interfaces for guiding users of a wireless sensing system to assets in an environment. The user interface includes various fields such as clickable buttons, text entry fields and dropdown menus for allowing a user to interact with the wireless sensing system to locate mobile assets and analyze their use. The user interface shown in FIGS. 15A-15B is for purposes of illustration only and other fields and displays may be provided.

FIG. 15A is a first interface 1350A enabling a user of a user device 1345 to transmit requests for information to the wireless sensing system. The user interface includes one or more dropdown boxes 1355 identifying asset types, asset names, asset identifiers, and the like. In the example of FIG. 15A, the user interface 1350A includes a dropdown box 1355 enabling a user to select one or more asset types, e.g., beds, IV trees, ventilators, Wound Vacs, and other medical equipment. The user interface 1350A further includes one or more filtering or ranking options 1360 based on, e.g., a current status of an asset, a current condition of an asset, a current location of an asset, a current location of a user, and the like. The filtering and ranking options may be stacked, such that a user may request to view only assets that are available for use, within 500 ft., and are filtered by proximity to a current location of the user at the time of the request. The options shown in FIG. 15A and described herein are for purposes of illustration only and other filtering options are contemplated.

FIG. 15B is a second interface 1350B guiding a user of the user device 1345 to locate an asset 1370. In an embodiment, the second interface 1350B is displayed by the user device 1345 responsive to a user submitting a request to locate an asset via the first interface 1350A. The second interface 1350B may be a map representation of the environment. The map representation may include one or more pins indicating a current location of the user 1375 and/or a current location of one or more assets 1370. The map representation may additionally include text, arrows, or other directional indicators to guide the user through the environment. In an embodiment, the map representation is interactive to provide information to the user describing one or more assets corresponding to a user's request. For example, pins corresponding to assets 1370 in the map representation are selectable to provide information describing the asset, e.g., the asset's type, name, identifier, condition, status, or other information. In some embodiments, pins corresponding to assets 1370 in the map representation may be color-coded or otherwise identifiably marked to represent a status or condition of the assets. For example, assets that are unavailable due to being in use or awaiting sanitation or cleaning may be represented using red pins, while assets that are available for use may be represented using green pins.

In an embodiment, the second interface 1350B may further comprise one or more augmented reality (AR) elements. For example, the second interface 1350B displays image or video data of an environment or asset, e.g., image data representing a storage area. The image or video data may be modified or overlaid with text, arrows, or other instructions to guide a user of the user device 1345 to an asset 1370, e.g., a pin placed on the image data to indicate a location of the asset. In another example, the second interface 1350B accesses a camera of the user device 1345 and displays real-time image or video data captured by the camera of the user device. The real-time image or video data may be modified or overlaid with text, arrows, or other instructions to guide a user of the user device 1345 to an asset 1370, e.g., by enabling a user to pan the camera around a storage area and to identify, by a green pin placed over captured video data, a requested asset. In other examples, other AR elements may be used by the interface 1350B.

In other embodiments, the user interface may include additional, fewer, or different elements than those shown in FIGS. 15A-15B, and the elements may be arranged or ordered differently. In some embodiments, the user interface may be modified based on a viewing device, such that information may be presented differently if the user device is, for example, a smartwatch or other device having limited or no screen space.

Computer Apparatus

Figure 16:
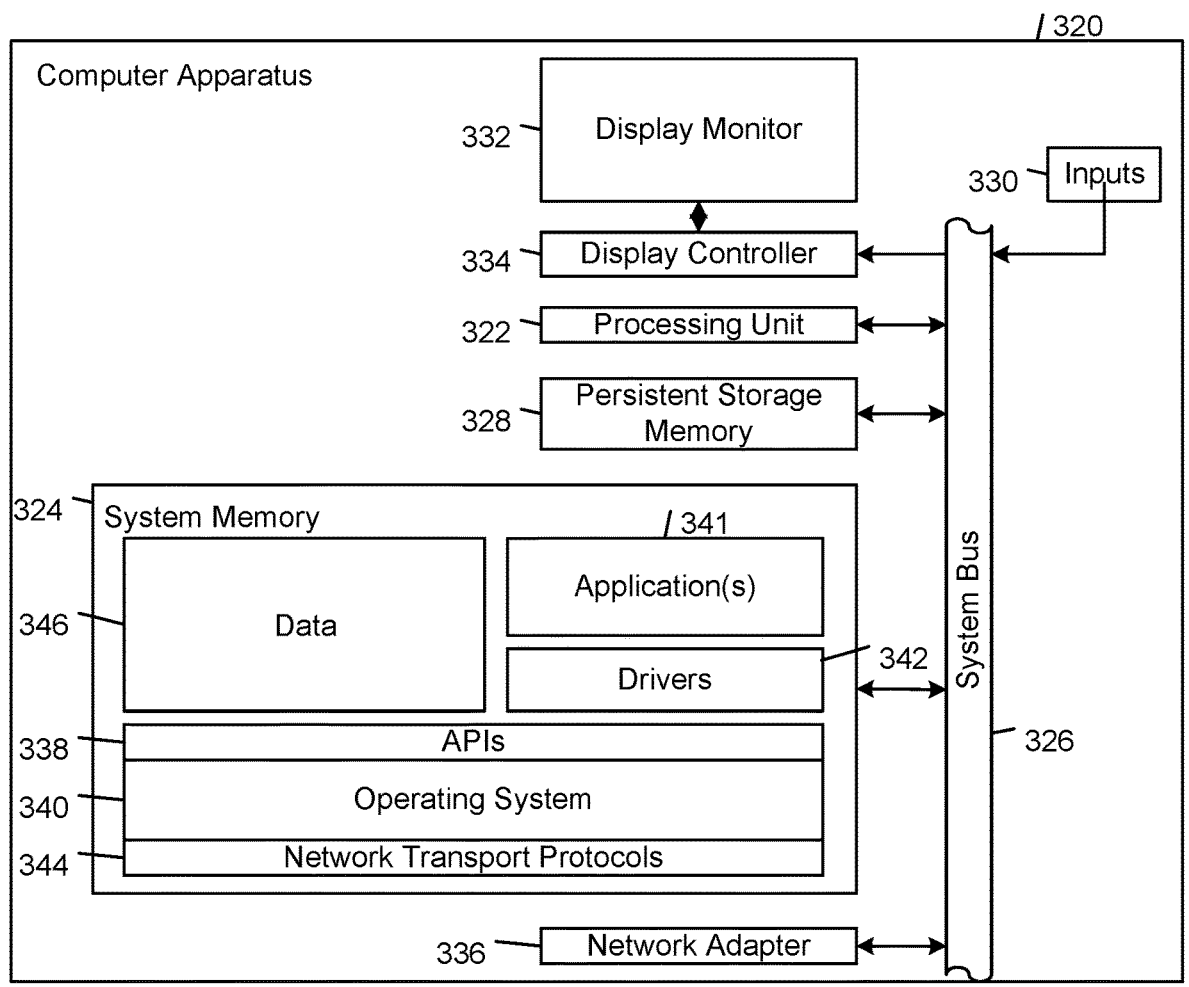
FIG. 16 is a block diagram of an example computer apparatus, in an embodiment.

FIG. 16 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

What is claimed is:

1. A method comprising:
   receiving, by a node of a wireless sensing system from a user device, a request for information describing an asset;
   establishing, by the node, communication connections with a set of tape nodes of the wireless sensing system, each tape node of the set of tape nodes being associated with a respective asset of the wireless sensing system;
   receiving, by the node via the communication connections, information describing the respective assets of the wireless sensing system;
   filtering, by the node, the information describing the respective assets of the wireless sensing system; and
   transmitting the filtered information to the user device for display.

2. The method of claim 1, wherein the filtering is based at least in part on one or more of: a name of the asset; a type of the asset; an identifier of the asset; a location of the asset; a status of the asset; a condition of the asset.

3. The method of claim 1, wherein each tape node of the set of tape nodes is adhered or affixed to the respective asset.

4. The method of claim 1, wherein the user device is configured to display an identifier of one or more assets corresponding to the request for information.

5. The method of claim 4, wherein the user device is further configured to display directions for the user to navigate to a current location of the one or more assets.

6. The method of claim 4, wherein the user device is further configured to display a map interface for the user to navigate to a current location of the one or more assets.

7. The method of claim 1, further comprising:
   transmitting, by the node, the filtered information to a server associated with the wireless sensing system.

8. The method of claim 1, wherein the node is a first tape node, the first tape node comprising:
   a processor;
   a battery;
   a memory; and
   a first wireless communication system.

9. The method of claim 1, wherein the first tape node further comprises:
   a flexible substrate;
   a device layer; and
   a cover layer on the flexible substrate covering the device layer.

10. The method of claim 1, wherein the request for information describing the asset comprise a type of the asset.

11. The method of claim 1, wherein the request for information describing the asset comprises an availability for using the asset.

12. A non-transitory computer readable storage medium storing instructions that, when executed, cause a processor to:
    receive, from a user device, a request for information describing an asset;
    establish communication connections with a set of tape nodes of the wireless sensing system, each tape node of the set of tape nodes being associated with a respective asset of the wireless sensing system;
    receive, via the communication connections, information describing the respective assets of the wireless sensing system;
    filter the information describing the respective assets of the wireless sensing system; and
    transmit the filtered information to the user device for display.

13. The non-transitory computer readable storage medium of claim 12, wherein the filtering is based at least in part on one or more of: a name of the asset; a type of the asset; an identifier of the asset; a location of the asset; a status of the asset; a condition of the asset.

14. The method of claim 12, wherein each tape node of the set of tape nodes is adhered or affixed to the respective asset.

15. The method of claim 12, wherein the user device is configured to display an identifier of one or more assets corresponding to the request for information.

16. The method of claim 15, wherein the user device is further configured to display directions for the user to navigate to a current location of the one or more assets.

17. The method of claim 15, wherein the user device is further configured to display a map interface for the user to navigate to a current location of the one or more assets.

* * * * *